(12) United States Patent
Xu et al.

(10) Patent No.: US 12,039,763 B2
(45) Date of Patent: Jul. 16, 2024

(54) IMAGE PROCESSING METHOD AND DEVICE, ELECTRONIC APPARATUS AND STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 407 days.

(21) Appl. No.: 17/469,903

(22) Filed: Sep. 9, 2021

(65) Prior Publication Data

US 2022/0092325 A1 Mar. 24, 2022

(30) Foreign Application Priority Data

Sep. 23, 2020 (CN) .......................... 202011006683.3

(51) Int. Cl.
*G06V 10/22* (2022.01)
*G06T 7/70* (2017.01)
*G06V 10/25* (2022.01)

(52) U.S. Cl.
CPC ................ *G06V 10/22* (2022.01); *G06T 7/70* (2017.01); *G06V 10/25* (2022.01)

(58) Field of Classification Search
None
See application file for complete search history.

(56) References Cited

U.S. PATENT DOCUMENTS

| | | | |
|---|---|---|---|
| 11,325,110 B2 * | 5/2022 | Lu .......................... | B01J 35/004 |
| 2019/0291723 A1 * | 9/2019 | Srivatsa ............... | G06V 10/764 |
| 2019/0294399 A1 * | 9/2019 | Yu ......................... | G06V 30/412 |
| 2021/0133474 A1 * | 5/2021 | Sawada .................. | G06N 3/045 |

* cited by examiner

*Primary Examiner* — Nancy Bitar
(74) *Attorney, Agent, or Firm* — JCIP GLOBAL INC.

(57) ABSTRACT

An image processing method includes obtaining an input image, the input image includes object regions, and each object region includes at least one object; identifying the object regions to obtain object region labeling frames; establishing a first coordinate system based on the input image, the object region labeling frames are located in the first coordinate system; mapping the object region labeling frames from the first coordinate system to a second coordinate system according to a reference value to obtain first region labeling frames corresponding to the object region labeling frames, the first region labeling frames are located in the second coordinate system; performing expansion processing on the first region labeling frames to obtain expanded second region labeling frames; and mapping the second region labeling frames from the second coordinate system to the first coordinate system according to the reference value to obtain table region labeling frames.

20 Claims, 11 Drawing Sheets

IMAGE PROCESSING METHOD AND DEVICE, ELECTRONIC APPARATUS AND STORAGE MEDIUM

CROSS REFERENCE TO RELATED APPLICATION

This application claims the priority benefit of Chinese application serial no. 202011006683.3, filed on Sep. 23, 2020. The entirety of the above-mentioned patent application is hereby incorporated by reference herein and made a part of this specification.

BACKGROUND

Technical Field

The disclosure relates to an image processing method, an image processing device, an electronic apparatus, and a non-transitory computer-readable storage medium.

Description of Related Art

Nowadays users often take pictures of objects (e.g., business cards, test papers, test sheets, documents, etc.) with an aim to perform corresponding processing on the photographed images to obtain information related to the objects in the images. According to different actual needs, in some cases, a user may hope that the information related to the object which is obtained based on the image may be presented in the form of a table, so that the obtained information is intuitive and standardized. Therefore, when the image is processed to obtain the information related to the object in the image, it is necessary to draw a table based on the size and position of the region occupied by the information related to the object in the image, and in this way, user's demand for presentation of the obtained information in the form of a table may be satisfied.

SUMMARY

The disclosure provides an image processing method. The image processing method includes the following steps. An input image is obtained. The input image includes a plurality of object regions, and each object region among the object regions includes at least one object. The object regions in the input image are identified to obtain a plurality of object region labeling frames corresponding to the object regions one-to-one. A first coordinate system is established based on the input image. The object region labeling frames are located in the first coordinate system. According to a reference value, the object region labeling frames are mapped from the first coordinate system to a second coordinate system to obtain a plurality of first region labeling frames corresponding to the object region labeling frames one-to-one. The first region labeling frames are located in the second coordinate system. Expansion processing is performed on the first region labeling frames to obtain a plurality of expanded second region labeling frames. The first region labeling frames correspond to the second region labeling frames one-to-one. According to the reference value, the second region labeling frames are mapped from the second coordinate system to the first coordinate system to obtain a plurality of table region labeling frames corresponding to the object regions one-to-one.

At least one embodiment of the disclosure provides an image processing device including an image acquisition module, a region identification module, a coordinate system establishment module, a coordinate mapping module, and an expansion processing module. The image acquisition module is configured to obtain an input image. The input image includes a plurality of object regions, and each object region among the object regions includes at least one object. The region identification module is configured to identify the object regions in the input image to obtain a plurality of object region labeling frames corresponding to the object regions one-to-one. The coordinate system establishment module is configured to establish a first coordinate system based on the input image. The object region labeling frames are located in the first coordinate system. The coordinate mapping module is configured to map the object region labeling frames from the first coordinate system to a second coordinate system according to a reference value to obtain a plurality of first region labeling frames corresponding to the object region labeling frames one-to-one. The first region labeling frames are located in the second coordinate system. The expansion processing module is configured to perform expansion processing on the first region labeling frames to obtain a plurality of expanded second region labeling frames. The first region labeling frames correspond to the second region labeling frames one-to-one. The coordinate mapping module is further configured to map the second region labeling frames from the second coordinate system to the first coordinate system according to the reference value to obtain a plurality of table region labeling frames corresponding to the object regions one-to-one.

At least one embodiment of the disclosure further provides an electronic apparatus including a processor and a storage. The storage is configured to store a computer-readable instruction. The processor is configured to implement the steps of the method according to any one of the abovementioned embodiments when executing the computer-readable instruction.

At least one embodiment of the disclosure further provides a non-transitory computer-readable storage medium. The non-transitory computer-readable storage medium is configured for non-transitory storage of a computer-readable instruction, and the computer-readable instruction is configured to implement the steps of the method according to any one of the abovementioned embodiments when being executed by a processor.

BRIEF DESCRIPTION OF THE DRAWINGS

In order to explain the technical solutions of the embodiments of the disclosure more clearly, the accompanying drawings of the embodiments will be briefly introduced below. Obviously, the accompanying drawings in the following description only relate to some embodiments of the disclosure, rather than limit the disclosure.

DESCRIPTION OF THE EMBODIMENTS

Figure 1A:
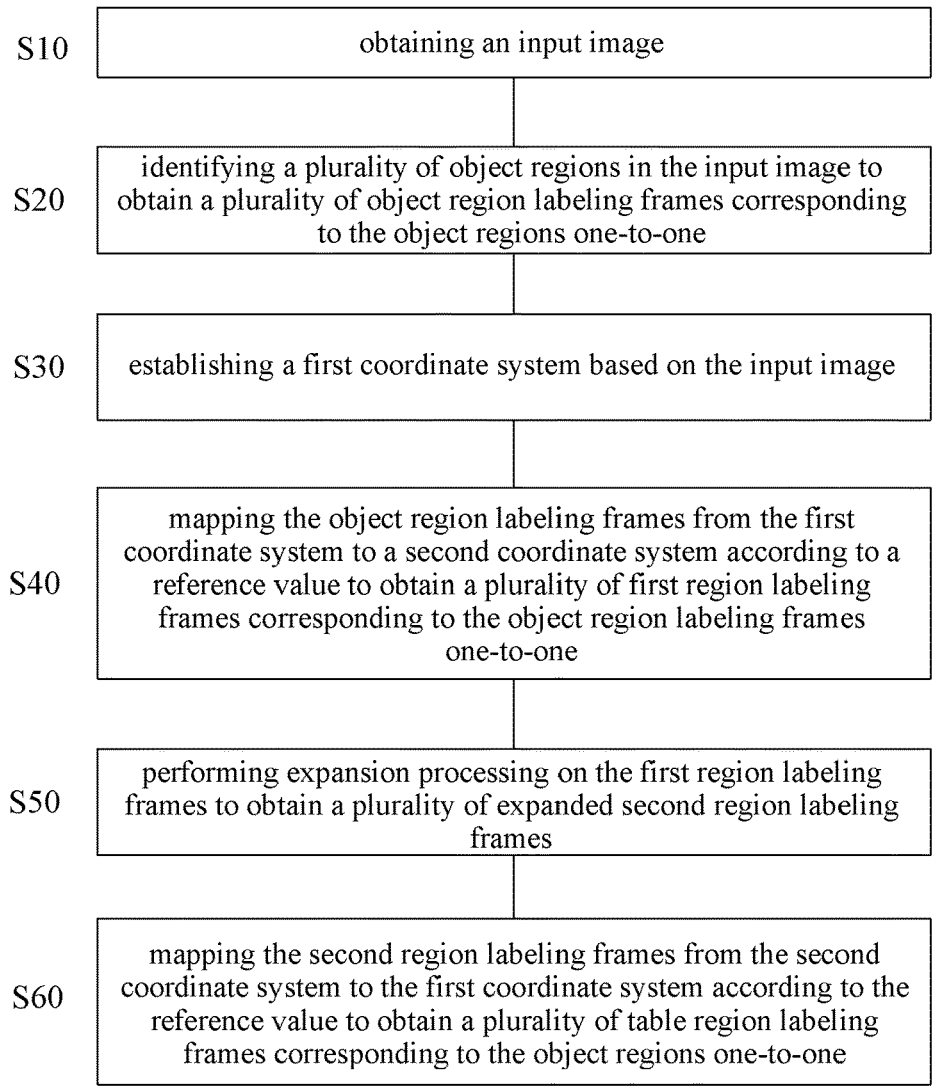
FIG. 1A is a schematic flow chart of an image processing method according to at least one embodiment of the disclosure.

To better illustrate the goal, technical solutions, and advantages of the disclosure, the accompanying drawings in the embodiments of the disclosure are included to provide a clear and complete description of the technical solutions provided in the embodiments of the disclosure. Obviously, the described embodiments are merely part of the embodiments, rather than all of the embodiments, of the disclosure. Based on the embodiments describing the disclosure, all other embodiments obtained by a person having ordinary skill in the art without making any inventive effort fall within the scope that the disclosure seeks to protect.

Unless otherwise defined, the technical terms or scientific terms used in the disclosure shall have the usual meanings understood by a person having ordinary skill in the art. The "first", "second" and similar words used in the disclosure do not indicate any order, quantity or importance, but are only used to distinguish different components. "Include" or "comprise" and other similar words mean that the element or item appearing before the word covers the elements or items listed after the word and their equivalents, but does not exclude other elements or items. "Connection" or "conjunction" and other similar words are not limited to physical or mechanical connections, but may include electrical connections, whether direct or indirect. "Up", "down", "left", "right", etc. are only used to indicate relative positional relationships. When the absolute position of the described object changes, the relative position relationship may also change accordingly. In order to keep the following description of the embodiments of the disclosure clear and concise, detailed description of some known functions and known components is omitted in the disclosure.

At least one embodiment of the disclosure provides an image processing method, an image processing device, an electronic apparatus, and a non-transitory computer-readable storage medium. In the image processing method provided by the embodiments of the disclosure, object regions in an input image are identified, expansion processing is performed on the object regions, and aligned table region labeling frames are obtained. In this way, a table region which is determined based on the object regions in the input image is obtained. Next, objects in the object regions may be filled into table region labeling frames, such that a table including information related to the objects in the input image is formed.

In the image processing method provided by the embodiments of the disclosure, each of the object regions in the input image is identified in combination with the machine learning technology. Further, based on positions and sizes of the object regions in the input image, expansion processing is performed on region ranges corresponding to the object regions, so that the table regions corresponding to the object regions in the input image are determined. The objects included in the object regions are then filled into the corresponding table regions to obtain the table including the information related to the objects in the input image. Since the table including the information related to the objects is formed based on the object regions in the input image, and the obtained information related to the objects in the input image may be intuitively and standardizedly presented in this way.

The image processing method provided by the embodiments of the disclosure may be applied to image processing device provided by the embodiments of the disclosure, and the image processing device may be disposed on the electronic apparatus. The electronic apparatus may be a personal computer, a mobile terminal, etc., and the mobile terminal may be a hardware apparatus such as a mobile phone or a tablet computer.

The embodiments of the disclosure will be described in detail below with reference to the accompanying drawings, but the disclosure is not limited to these specific embodiments.

FIG. 1A is a schematic flow chart of an image processing method according to at least one embodiment of the disclosure.

As shown in FIG. 1A, the image processing method provided by at least one embodiment of the disclosure includes steps S10 to S60.

For instance, as shown in FIG. 1A, in step S10, an input image is obtained. The input image includes a plurality of object regions, and each object region among the object regions includes at least one object.

For instance, the input image may be an image which is obtained by a user through taking a photo of an object. The at least one object may be, for example, business cards, test paper, test sheets, documents, invoices, and the like. Correspondingly, the at least one object in the input image may be text (Chinese and/or foreign language or printed text and/or handwritten text), data, graphics, symbols, etc. contained in the at least one object.

For instance, the at least one object in each object region is arranged in a row in a first direction. In the description of the disclosure, taking the at least one object contained in the input image as text as an example, the first direction may be a row direction or a column direction of text arrangement.

For instance, a shape of the input image may be a regular shape such as a rectangle or a square or an irregular shape. The shape and a size of the input image may be configured by the user according to actual situations.

For instance, the input image may be an image captured by a digital camera or a mobile phone, and the input image may be a grayscale image or a color image. For instance, the input image may be an original image directly collected by a digital camera or a mobile phone or an image which is obtained after the original image is processed.

For instance, a shape of an object region to be identified in the input image may be a regular shape such as a rectangle or a square or may be an irregular shape, as long as the object region may cover the corresponding object.

Next, as shown in FIG. 1A, in step S20, the object regions in the input image are identified to obtain a plurality of object region labeling frames corresponding to the object regions one-to-one.

For instance, the object regions in the input image may be identified through a region identification model. For instance, the region identification model may be implemented through machine learning technology and may run on a general-purpose computing apparatus or a dedicated computing apparatus, for example. The region identification model is a neural network model obtained by pre-training. For instance, the region identification model may be implemented by using a neural network such as a deep convolutional neural network (DEEP-CNN).

For instance, specific shapes of the object region labeling frames may be determined according to the specific shapes, sizes, etc. of the object regions. The object region labeling frames surround the corresponding object region and may contain all the objects located in this object region. For instance, a distance between border frames of the object region labeling frames and the objects located at an edge of the object region may be close to 0. In this way, the shapes of the object region labeling frames are close to the actual shapes of the object regions. For instance, in order to facilitate subsequent operations, in the embodiments provided by the disclosure, the shapes of the object region labeling frames may be configured to regular shapes such as a rectangle, a square, etc., so that the subsequent operation of expansion processing may be facilitated.

Note that in the disclosure, "the shapes of the object regions" means the general shapes of the object regions. Similarly, "the shapes of the object region labeling frames" means the general shapes of the object region labeling frames. For instance, taking the object region labeling frames as an example, when the shapes of the object region labeling frames are rectangles, a specific side of each rectangle may not be a straight line segment, but may be a line segment having a small wave shape or a zigzag shape. Besides, the two sides of the rectangle facing each other may not be parallel.

Next, as shown in FIG. 1A, in step S30, a first coordinate system is established based on the input image.

For instance, the object region labeling frames are located in the first coordinate system.

For instance, at least one object in each object region is arranged in a row in the first direction. A first coordinate axis of the first coordinate system is parallel to the first direction, and a second coordinate axis of the first coordinate system is parallel to the second direction perpendicular to the first direction. For instance, taking the objects contained in the object regions as text as an example, the first direction may be the row direction or the column direction of the text, and correspondingly, the second direction may be the column direction or the row direction of the text.

For instance, regarding establishment of the first coordinate system, a center of the input image may be treated as an origin to establish the first coordinate system, any vertex of the input image may be treated as the origin to establish the first coordinate system, or any point of the input image may be treated as the origin to establish the first coordinate system, which is not particularly limited by the disclosure. In the embodiments of the disclosure, the vertex at the upper left corner of the input image is treated as the origin of the first coordinate system. Extending downwards from the origin, the axis is the second coordinate axis of the first coordinate system, that is, the Y axis. Extending from the origin to the right, the axis is the first coordinate axis of the first coordinate system, that is, the X axis. In some embodiments, the first direction may be parallel to a horizontal direction, that is, the X-axis direction is parallel to the horizontal direction. The second direction may be parallel to a vertical direction, that is, the Y-axis direction is parallel to the vertical direction.

Note that the coordinates in the first coordinate system are in pixels. The "object region labeling frames are located in the first coordinate system" means that the coordinates corresponding to the object region labeling frames are determined based on the first coordinate system.

In some embodiments of the disclosure, the at least one object in each object region is arranged in a row in the first direction, and step 30 may include the following steps S301 to S303.

In step S301, a plurality of slopes of the object region labeling frames are determined, and the slope of each object region labeling frame among the object region labeling frames represents the slope of a side of each object region labeling frame extending in the first direction with respect to the first direction.

In step S302, correction processing is performed on the input image according to the slopes of the object region labeling frames to obtain a corrected input image.

In step S303, the first coordinate system is established based on the corrected input image. For instance, the first coordinate axis of the first coordinate system is parallel to the first direction, and the second coordinate axis of the first coordinate system is parallel to the second direction perpendicular to the first direction.

It thus can be seen that through steps S301 to S303, the first coordinate system is established after the input image is corrected. In this way, the first coordinate system is accurately established, accuracy and precision of the coordinates of the obtained object region labeling frames in the first coordinate system are improved, and expansion processing to be subsequently performed on first region labeling frames which are obtained based on the object region labeling frames is thereby facilitated.

Note that "the side of each object region labeling frame extending in the first direction" may indicate the side of each object region labeling frame away from the X axis of the first coordinate system or may indicate the side of each object region labeling frame close to the X axis of the first coordinate system.

For instance, in step S302, an average of the slopes is calculated according to the slopes of the object region labeling frames, and the input image is rotated in a plane formed by the first direction and the second direction based on the average of the slopes, such that the average of the slopes approaches 0. In this way, correction processing of the input image is accomplished.

Note that in some embodiments, correction processing performed on the input image includes global correction and local correction of the input image. Regarding the global correction, the global offset of the text lines may be corrected, but details that are not yet adjusted still exist after the global correction is performed. Regarding the local correction, some supplementary corrections for details that are ignored in the global correction process may be performed to prevent the loss of details caused by the global correction, so as to improve the accuracy of the correction.

In step S40, the object region labeling frames are mapped from the first coordinate system to a second coordinate system according to a reference value to obtain a plurality of first region labeling frames corresponding to the object region labeling frames one-to-one. The first region labeling frames are located in the second coordinate system. The "first region labeling frames are located in the second coordinate system" means that the coordinates corresponding to the first region labeling frames are determined based on the second coordinate system.

For instance, a first coordinate axis of the second coordinate system is parallel to the first coordinate axis of the first coordinate system, and a second coordinate axis of the second coordinate system is parallel to the second coordinate axis of the first coordinate system.

For instance, an origin of the second coordinate system may be any point. Extending downwards from the origin of the second coordinate system, the axis is the second coordinate axis of the second coordinate system, that is, the Y axis. Extending from the origin of the second coordinate system to the right, the axis is the first coordinate axis of the second coordinate system, that is, the X axis. In some embodiments, the first direction may be parallel to the horizontal direction, that is, the X-axis direction is parallel to the horizontal direction. The second direction may be parallel to the vertical direction, that is, the Y-axis direction is parallel to the vertical direction. The second coordinate system may be expressed as a coordinate system OXY shown in FIG. 2A to be described below.

For instance, the abovementioned reference value may be determined according to factors such as the size of the input image, the size of the object region labeling frames, and the like. Therefore, after the coordinates of the object region labeling frames in the first coordinate system are converted to the corresponding coordinates in the second coordinate system, operation of the subsequent expansion processing may be facilitated.

In some embodiments of the disclosure, step S40 may include the following steps S401 to S403.

In step S401, first coordinates of vertexes of the object region labeling frames in the first coordinate system are obtained.

In step S402, the first coordinates of the vertexes of the object region labeling frames are mapped to the second coordinate system based on the reference value to obtain second coordinates of the vertexes of the object region labeling frames in the second coordinate system.

In step S403, according to the second coordinates of the vertexes of the object region labeling frames in the second coordinate system, the first region labeling frames corresponding to the object region labeling frames one-to-one are determined. Coordinates of vertexes of the first region labeling frames in the second coordinate system are the second coordinates of the vertexes of the corresponding object region labeling frames in the second coordinate system.

For instance, in some embodiments, since the shapes of the object region labeling frames and the corresponding first region labeling frames are identical or similar, the first region labeling frames corresponding to the object region labeling frames may be obtained after the corresponding second coordinates of the vertexes in the second coordinate system are determined based on the first coordinates of the vertexes of the object region labeling frames. As such, the process of mapping the object region labeling frames from the first coordinate system to the second coordinate system is simplified, the required calculation amount is reduced, and the image processing process is optimized.

For instance, in step S402, the second coordinates of the vertexes of the object region labeling frames which are obtained based on the reference value in the second coordinate system may be coordinate values after discretization processing, for example, the coordinate values which are obtained after the floating point numbers in the coordinate values are integerized. In this way, shapes of the determined first region labeling frames may be regular, and the subsequent operation of expansion processing may thus be facilitated. Further, shapes of table region labeling frames obtained in subsequent steps may be regular and standardized, so that generation of a table by using the table region labeling frames may be facilitated.

For instance, in step S402, the first coordinates of the vertexes of the object region labeling frames are divided by the reference value to obtain middle coordinates of the vertexes of the object region labeling frames, and rounding off processing is performed on the middle coordinates of the vertexes of the object region labeling frames to obtain the second coordinates of the vertexes of the object region labeling frames in the second coordinate system.

Accordingly, through the rounding off processing performed on the middle coordinates which are obtained based on the first coordinates of the vertexes of the object region labeling frames, the second coordinates in integer form may be obtained. The position, size, shape, etc. of the first region labeling frames which are determined according to the second coordinates in the second coordinate system are standardized, the subsequent operation of expansion processing may thus be facilitated.

Note that the "mapping from the first coordinate system to the second coordinate system" is equivalent to mapping the object region labeling frames from a high-resolution cell to a low-resolution cell.

For instance, in some embodiments, the object in the input image may include text, and the reference value may be determined according to an average character height of the text.

For instance, the reference value may be equal to one third of the average character height of the text, so that the first region labeling frames corresponding to the object region labeling frames obtained after rounding based on the reference value may be used to facilitate subsequent operation of expansion processing.

Note that in some embodiments, the reference value may also be other suitable values. For instance, taking the text as an example, the reference value may also be one-quarter, one-half, or two times the average character height of the text, and other suitable values, which is not limited by the embodiments of the disclosure.

For instance, the reference value is a value in pixels.

Next as shown in FIG. 1A, in step S50, expansion processing is performed on the first region labeling frames to obtain a plurality of expanded second region labeling frames. For instance, the first region labeling frames correspond to the second region labeling frames one-to-one, so that the second region labeling frames correspond to the object region labeling frames one-to-one.

In step S50, through the expansion processing performed on the first region labeling frames, the second region labeling frames that are orderly and regularly arranged may be obtained based on the first region labeling frames. In this way, the table region which is subsequently determined by the table region labeling frames is provided in an orderly and standardized manner, so that the information related to the object in the input image provided by the table region is presented in an orderly and intuitive manner to facilitate accessing and using performed by the user.

In some embodiments of the disclosure, each second region labeling frame among the second region labeling frames obtained after expansion processing needs to meet the condition that it cannot be expanded relative to the adjacent second region labeling frame. Therefore, in some embodiments of the disclosure, when expansion processing is performed on the first region labeling frames, the corresponding second region labeling frames may be obtained after one time of expansion processing is performed on the first region labeling frames, or the corresponding second region labeling frames may only be obtained after expansion processing is repeatedly performed for several times on the first region labeling frames. That is, each first region labeling frame may be expanded one or more times to obtain the second region labeling frame after the final expansion processing. Finally, widths of the second region labeling frames located in the same column are approximately the same, and heights of the second region labeling frames located in the same row are approximately the same. In the embodiment of the disclosure, the number of times of expansion processing is not specifically limited. The "width" may indicate a length of a side of each second region labeling frame parallel to the row direction, and the "height" may indicate the length of the side of each second region labeling frame parallel to the column direction.

Figure 1B:
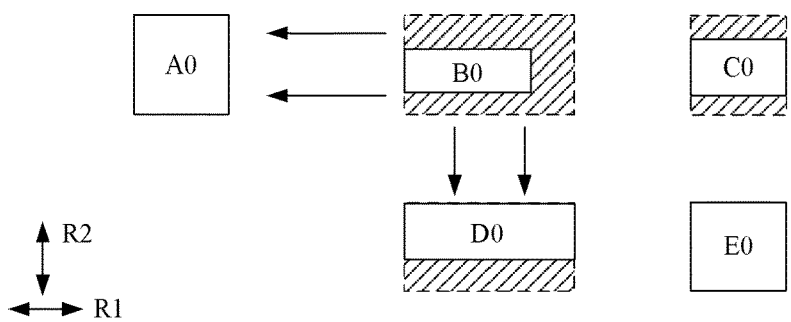
FIG. 1B is a schematic diagram of expansion processing performed on a plurality of first region labeling frames according to at least one embodiment of the disclosure.

For instance, as shown in FIG. 1B, when expansion processing is performed on first region labeling frames A0, B0, C0, D0, and E0, the first region labeling frame B0 may be expanded up and down in a second direction R2 with reference to the first region labeling frame A0, the first region labeling frame B0 may be expanded left and right in a first direction R1 with reference to the first region labeling frame D0, the first region labeling frame C0 may be expanded up and down in the second direction R2 with reference to the first region labeling frame B0, and the first region labeling frame D0 may be expanded up and down in the second direction R2 with reference to the first region labeling frame E0.

For instance, in the case that it is necessary to satisfy the condition that each second region labeling frame after expansion processing may not be expanded relative to the adjacent second region labeling frame, step S50 may include the following steps. One first region labeling frame among the first region labeling frames is randomly selected, and expansion processing is sequentially performed on the first region labeling frames starting from the one first region labeling frame according to a first order. After performing expansion processing on the first region labeling frames according to the first order, a plurality of expansion region labeling frames are obtained. In response to each expansion region labeling frame among the expansion region labeling frames being not expanded relative to the adjacent expansion region labeling frame, the expansion region labeling frames are treated as the second region labeling frames. In response to at least one expansion region labeling frame among the expansion region labeling frames being expanded relative to the adjacent expansion region labeling frame, one expansion region labeling frame among the expansion region labeling frames is randomly select. Expansion processing is sequentially performed on the expansion region labeling frames starting from the one expansion region labeling frame according to a second order and so on until each expansion region labeling frame among the expansion region labeling frames is not expanded relative to the adjacent expansion region labeling frame. The expansion region labeling frames are treated as the second region labeling frames.

For instance, the first order and the second order may be randomly determined. For instance, the first order and the second order may be identical or may be different. For instance, a starting point of the first order and the second order may begin from the first region labeling frame located at an edge position, may begin from the first region labeling frame located at a central position of the first region labeling frames, or may begin from the first region labeling frame located at any other position for expansion processing. For instance, expansion processing may be performed in a clockwise order or a counterclockwise order in the first direction and the second direction, may be sequentially performed in row arrangement direction or in column arrangement direction, or may be performed according to any random order, which is not particularly limited by the embodiments of the disclosure.

Finally, as shown in FIG. 1A, in step S60, the second region labeling frames are mapped from the second coordinate system to the first coordinate system according to the reference value to obtain a plurality of table region labeling frames corresponding to the object regions one-to-one.

In step S60, the expanded second region labeling frames are mapped from the second coordinate system to the first coordinate system according to the reference value, so that the table region labeling frames of the table regions corresponding to the object regions are obtained. A table corresponding to the object regions in the input image is thus generated.

For instance, step S60 may include the following steps S601 to S603.

In step S601, second coordinates of vertexes of the second region labeling frames in the second coordinate system are obtained.

In step S602, the second coordinates of the vertexes of the second region labeling frames are mapped from the second coordinate system to the first coordinate system based on the reference value to obtain first coordinates of the vertexes of the second region labeling frames in the first coordinate system.

In step S603, according to the first coordinates of the vertexes of the second region labeling frames in the first coordinate system, the table region labeling frames are determined corresponding to the second region labeling frames one-to-one. Herein, coordinates of vertexes of the table region labeling frames in the first coordinate system are the first coordinates of the vertexes of the corresponding second region labeling frames in the first coordinate system.

For instance, in step S602, the second coordinates of the vertexes of the second region labeling frames in the second coordinate system are multiplied by the reference value to obtain middle coordinates of the vertexes of the second region labeling frames, and rounding off processing is performed on the middle coordinates of the vertexes of the second region labeling frames to obtain the first coordinates of the vertexes of the second region labeling frames in the second coordinate system.

Note that steps S601 to S603 are basically similar to steps S401 to S403, so description thereof may be found with reference to the corresponding description of steps S401 to S403 and thus is not repeated herein. A difference therebetween is that steps S601 to S603 are provided to achieve mapping from the second coordinate system to the first coordinate system, and steps S401 to S403 are provided to achieved mapping from the first coordinate system to the second coordinate system.

In some embodiments of the disclosure, besides steps S10 to S60, the image processing method further includes the following step S70.

In step S70, objects included in the object regions are identified, and the objects included in the object regions are correspondingly filled into the table region labeling frames to generate a table.

In step S70, the objects included in the object regions of the input image may be identified through a character identification model, and the identified and obtained objects are filled into the table regions determined by the table region labeling frames. In this way, a table including information related to the objects in the input image is generated, so that the user may obtain information such as data and text content in the input image intuitively and standardizedly through the generated table.

For instance, the character identification model may be implemented through technology based on optical character identification and the like and may run on a general-purpose computing apparatus or a dedicated computing apparatus, for example. For instance, the character identification model may be a pre-trained neural network model.

In some embodiments of the disclosure, the aforementioned at least one object includes text, that is, the information related to the object may be shown by text, such as words, numbers, symbols, etc. In some examples, after step S70 is performed, the image processing method may further include the following step. A character height and/or font of the text filled in the table region labeling frames may be adjusted. In this way, the generate table is clear and standardized, and the user may thereby intuitively and conveniently obtain the required information.

For instance, the character height of the original text may be recorded, and the text may be filled in with a predetermined font.

In the following, in FIG. 2A, FIG. 3A, FIG. 4A, and FIG. 5 provided by the embodiments of the disclosure, the different arrangements of the first region labeling frames which are obtained based on the object region labeling frames in the input image are treated as examples to specifically describe step S50.

For instance, the at least one object in each object region is arranged in a row in the first direction. The first coordinate axis of the first coordinate system is parallel to the first direction, the second coordinate axis of the first coordinate system is parallel to the second direction perpendicular to the first direction, the first coordinate axis of the first coordinate system is parallel to the first direction, and the second coordinate axis of the second coordinate system is parallel to the second direction. Each first region labeling frame among the first region labeling frames includes a first side and a second side opposite to each other in the first direction and a third side and a fourth side opposite to each other in the second direction. Each second region labeling frame among the second region labeling frames includes a first side and a second side opposite to each other in the first direction and a third side and a fourth side opposite to each other in the second direction.

For instance, in some embodiments, the first region labeling frames are arranged in a row in the first direction or the second direction. Step S50 may include the following steps S501 to S503. For instance, after step S501 is performed, in response to the first region labeling frames being arranged in a row in the first direction, step S502 is performed, and in response to the first region labeling frames being arranged in a row in the second direction, step S503 is performed.

In step S501, an $i^{th}$ first region labeling frame and a $j^{th}$ first region labeling frame adjacent to each other among the first region labeling frames are obtained. i and j are positive integers that are less than or equal to a number of the first region labeling frames, and i and j are different from each other.

In response to the first region labeling frames being arranged in a row in the first direction, the following step is provided.

In step S502, a coordinate interval formed by coordinate values of two vertexes of the first side or the second side of the $i^{th}$ first region labeling frame on the second coordinate axis of the second coordinate system is obtained to act as a first coordinate interval, and a coordinate interval formed by coordinate values of two vertexes of the first side or the second side of the $j^{th}$ first region labeling frame on the second coordinate axis of the second coordinate system is obtained to act as a second coordinate interval. A union of the first coordinate interval and the second coordinate interval is taken to obtain a third coordinate interval. Expansion processing is performed on the first side and the second side of the $i^{th}$ first region labeling frame in the second direction to obtain the second region labeling frame corresponding to the $i^{th}$ first region labeling frame. Each of coordinate intervals formed by coordinate values of two vertexes of the first side and two vertexes of the second side of the second region labeling frame corresponding to the $i^{th}$ first region labeling frame on the second coordinate axis of the second coordinate system is the third coordinate interval. Expansion processing is performed on the first side and the second side of the $j^{th}$ first region labeling frame in the second direction to obtain the second region labeling frame corresponding to the $j^{th}$ first region labeling frame. Each of coordinate intervals formed by coordinate values of two vertexes of the first side and two vertexes of the second side of the second region labeling frame corresponding to the $i^{th}$ first region labeling frame on the second coordinate axis of the second coordinate system is the third coordinate interval.

In response to the first region labeling frames being arranged in a row in the second direction, the following step is provided.

In step S503, a coordinate interval formed by coordinate values of two vertexes of the third side or the fourth side of the $i^{th}$ first region labeling frame on the first coordinate axis of the second coordinate system to is obtained to act as a first coordinate interval, and a coordinate interval formed by coordinate values of two vertexes of the third side or the fourth side of the $j^{th}$ first region labeling frame on the first coordinate axis of the second coordinate system is obtained to act as a second coordinate interval. A union of the first coordinate interval and the second coordinate interval is taken to obtain a third coordinate interval. Expansion processing is performed on the third side and the fourth side of the $i^{th}$ first region labeling frame in the first direction to obtain the second region labeling frame corresponding to the $i^{th}$ first region labeling frame. Each of coordinate intervals formed by coordinate values of two vertexes of the third side and two vertexes of the fourth side of the second region labeling frame corresponding to the $i^{th}$ first region labeling frame on the first coordinate axis of the second coordinate system is the third coordinate interval. Expansion processing is performed on the third side and the fourth side of the $j^{th}$ first region labeling frame in the first direction to obtain the second region labeling frame corresponding to the $j^{th}$ first region labeling frame. Each of coordinate intervals formed by coordinate values of two vertexes of the third side and two vertexes of the fourth side of the second region labeling frame corresponding to the $j^{th}$ first region labeling frame on the first coordinate axis of the second coordinate system is the third coordinate interval.

Figure 2A:
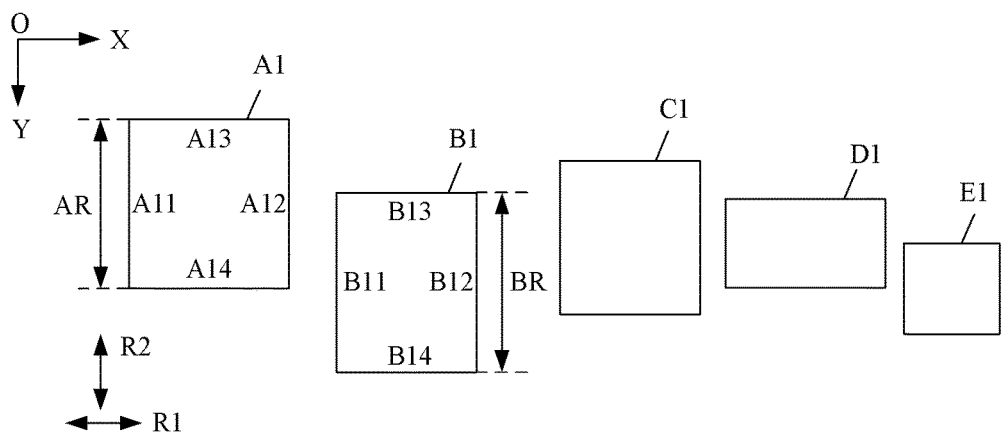
FIG. 2A is a schematic diagram of a plurality of first region labeling frames according to at least one embodiment of the disclosure.
Figure 2B:
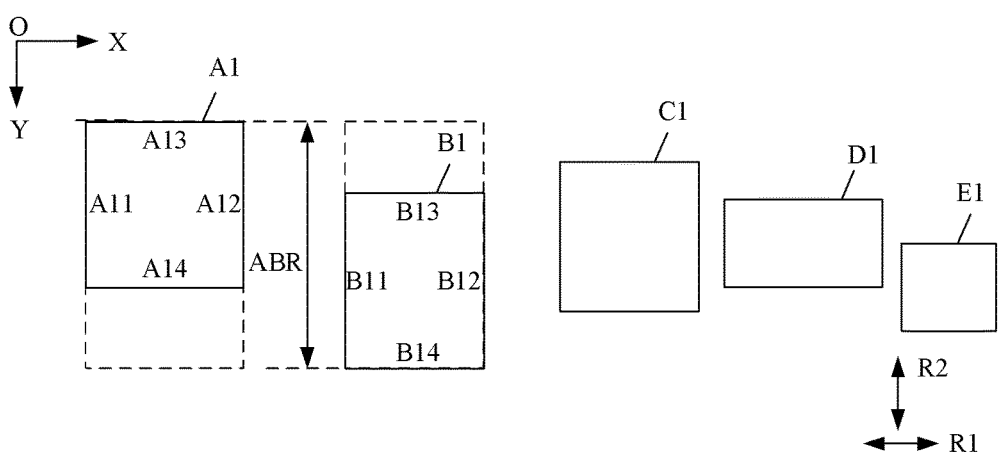
FIG. 2B is a schematic diagram of expansion processing performed on two first region labeling frames adjacent to each other as shown in FIG. 2A.
Figure 2C:
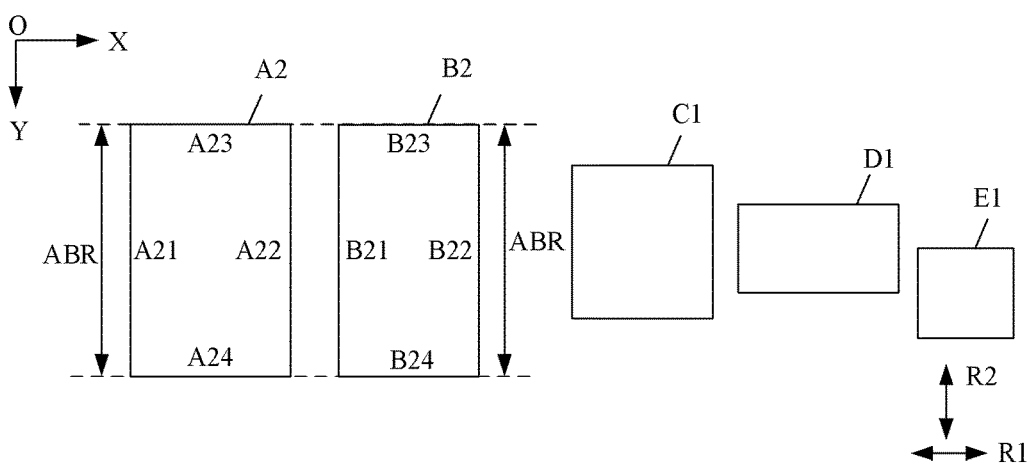
FIG. 2C is a schematic diagram of corresponding second region labeling frames which are obtained after expansion processing is performed on the two first region labeling frames adjacent to each other as shown in FIG. 2A.

FIG. 2A is a schematic diagram of a plurality of first region labeling frames according to at least one embodiment of the disclosure. FIG. 2B is a schematic diagram of expansion processing performed on two first region labeling frames adjacent to each other as shown in FIG. 2A. FIG. 2C is a schematic diagram of corresponding second region labeling frames which are obtained after expansion processing is performed on the two first region labeling frames adjacent to each other as shown in FIG. 2A.

As shown in FIG. 2A, a plurality of first region labeling frames A1, B1, C1, D1, and E1 are arranged in a row in the first direction R1. For instance, taking the first region labeling frames A1 and B1 as an example, the first region labeling frame A1 includes a first side A11 and a second side A12 opposite to each other in the first direction R1 and a third side A13 and a fourth side A14 opposite to each other in the second direction R2, and the first region labeling frame B1 includes a first side B11 and a second side B12 opposite to each other in the first direction R1 and a third side B13 and a fourth side B14 opposite to each other in the second direction R2. For instance, as shown in FIG. 2C, the second region labeling frame A2 which is obtained after expansion processing is performed on the first region labeling frame A1 includes a first side A21 and a second side A22 opposite to each other in the first direction R1 and a third side A23 and a fourth side A24 opposite to each other in the second direction R2, and the second region labeling frame B2 which is obtained after expansion processing is performed on the first region labeling frame B1 includes a first side B21 and a second side B22 opposite to each other in the first direction R1 and a third side B23 and a fourth side B24 opposite to each other in the second direction R2.

Note that the number of first region labeling frames corresponds to the number of object regions or object region labeling frames in the acquired input image. In the examples shown in FIG. 2A to FIG. 2C, the number of the first region labeling frames is exemplary only. In some other embodiments of the disclosure, the input image may also include more or fewer object regions, and correspondingly, the number of first region labeling frames may also be 2, 3, 4, 6, or more, which is not limited by the embodiments of the disclosure.

Note that in the embodiments of the disclosure, as the first region labeling frames are arranged in a row in the first direction R1, the adjacent two first region labeling frames (the two first region labeling frames are adjacent to each other in the first direction R1 herein) are required to satisfy the following conditions. In the first direction R1, another first region labeling frame is not provided between the two first region labeling frames, and an intersection of the interval formed by the coordinate values of the two vertexes of the first side or the second side of one first region labeling frame between the two first region labeling frames on the second coordinate axis of the second coordinate system and the interval formed by the coordinate values of the two vertexes of the first side or the second side of the other first region labeling frame on the second coordinate axis of the second coordinate system is provided and the intersection is not empty. For instance, as shown in the example of FIG. 2A, the first region labeling frames A1 and B1 may be treated as two first region labeling frames adjacent to each other, the first region labeling frames B1 and C1 may be treated as two first region labeling frames adjacent to each other, and the rest may be deduced by analogy.

For instance, taking the first region labeling frame A1 treated as the $i^{th}$ first region labeling frame and the first region labeling frame B1 treated as the $j^{th}$ first region labeling frame as an example, in step S501, the first region labeling frame A1 and the first region labeling frame B1 adjacent to each other are obtained.

For instance, with reference to FIG. 2A to FIG. 2C together, in step S502, a coordinate interval formed by coordinate values of two vertexes of the first side A11 or the second side A12 of the first region labeling frame A1 on the second coordinate axis Y of the second coordinate system OXY is obtained to act as a first coordinate interval AR, and a coordinate interval formed by coordinate values of two vertexes of the first side B11 or the second side B12 of the first region labeling frame B1 on the second coordinate axis Y of the second coordinate system OXY is obtained to act as a second coordinate interval BR. A union of the first coordinate interval AR and the second coordinate interval BR is taken to obtain a third coordinate interval ABR. Expansion processing is performed on the first side A11 and the second side A12 of the first region labeling frame A1 in the second direction R2 to obtain the second region labeling frame A2 corresponding to the first region labeling frame A1. Expansion processing is performed on the first side B11 and the second side B12 of the first region labeling frame B1 in the second direction R2 to obtain the second region labeling frame B2 corresponding to the first region labeling frame B1.

For instance, each of coordinate intervals formed by coordinate values of two vertexes of the first side A21 and two vertexes of the second side A22 of the second region labeling frame A2 corresponding to the first region labeling frame A1 on the second coordinate axis Y of the second coordinate system OXY is the third coordinate interval ABR. Each of coordinate intervals formed by coordinate values of two vertexes of the first side B21 and two vertexes of the second side B22 of the second region labeling frame B2 corresponding to the first region labeling frame B1 on the second coordinate axis Y of the second coordinate system OXY is the third coordinate interval ABR. That is, the length of the first side A21 (or the second side A22) of the second region labeling frame A2 and the length of the first side B21 (or the second side B22) of the second region labeling frame B2 are the same.

For instance, as shown in FIG. 2C, the third side A23 of the second region labeling frame A2 and the third side B23 of the second region labeling frame B2 are aligned, and the fourth side A24 of the second region labeling frame A2 and the fourth side B24 of the second region labeling frame B2 are aligned. That is, the third side A23 of the second region labeling frame A2 and the third side B23 of the second region labeling frame B2 are located on the same horizontal line, and the fourth side A24 of the second region labeling frame A2 and the fourth side B24 of the second region labeling frame B2 are located on the same horizontal line. In this way, the corresponding table region labeling frames which are subsequently obtained based on the second region labeling frames A2 and B2 may be regular and orderly.

Note that in the examples of the disclosure, the expansion processing performed on the first region labeling frames may be required to be performed once or may be required to be performed for multiple times, so as to satisfy the condition that the obtained second region labeling frames after the expansion processing is performed on the first region labeling frames are not expanded relative to the adjacent second region labeling frames to complete the expansion processing performed on all of the first region labeling frames. For instance, step S502 may be required to be executed once or for multiple times so as to allow the obtained second region labeling frames A2 and B2 to satisfy the above condition.

Note that in the examples shown in FIG. 2A to FIG. 2C, the plurality of first region labeling frames A1, B1, C1, D1, and E1 arranged in a row in the first direction R1 are treated as an example for description. In other examples of the disclosure, the plurality of first region labeling frames A1, B1, C1, D1, and E1 may also be arranged in a row in the second direction R2, and herein, in response to the first region labeling frames A1, B1, C1, D1, and E1 being arranged in a row in the second direction R2, step S503 is performed. Specific content of step S503 may be found with reference to the description related to step S502, and repeated description is not provided herein.

For instance, in some embodiments, the first region labeling frames are arranged in a plurality of rows and a plurality of columns in the first direction and the second direction. Step S50 may include the following steps S511 to S516.

In step S511, an $i^{th}$ first region labeling frame and a $j^{th}$ first region labeling frame adjacent to each other in the first direction among the first region labeling frames are obtained. Herein, i and j are positive integers that are less than or equal to the number of the first region labeling frames, and i and j are different from each other.

In step S512, a coordinate interval formed by coordinate values of two vertexes of the first side or the second side of the $i^{th}$ first region labeling frame on the second coordinate axis of the second coordinate system is obtained to act as a first coordinate interval, and a coordinate interval formed by coordinate values of two vertexes of the first side or the second side of the $j^{th}$ first region labeling frame on the second coordinate axis of the second coordinate system is obtained to act as a second coordinate interval. A union of the first coordinate interval and the second coordinate interval is taken to obtain a third coordinate interval. Herein, the third coordinate interval includes a first end point value and a second end point value. Compared to a coordinate value of the fourth side of the $i^{th}$ first region labeling frame on the second coordinate axis of the second coordinate system, a coordinate value of the third side of the $i^{th}$ first region labeling frame on the second coordinate axis of the second coordinate system is closer to the first end point value, and compared to a coordinate value of the fourth side of the $j^{th}$ first region labeling frame on the second coordinate axis of the second coordinate system, a coordinate value of the third side of the $j^{th}$ first region labeling frame on the second coordinate axis of the second coordinate system is closer to the first end point value.

In step S513, when one side close to the third side of the $i^{th}$ first region labeling frame is not provided with a first region labeling frame adjacent to the $i^{th}$ first region labeling frame in the second direction or when an intersection of a coordinate interval formed by coordinate values of two vertexes of the first side or the second side of the first region labeling frame adjacent to the $i^{th}$ first region labeling frame in the second direction and located on one side close to the third side of the $i^{th}$ first region labeling frame on the second coordinate axis of the second coordinate system and the third coordinate interval is empty, expansion processing is performed on the first side and the second side of the $i^{th}$ first region labeling frame in the second direction to determine the third side of the second region labeling frame corresponding to the $i^{th}$ first region labeling frame. Herein, a coordinate value of two vertexes of the third side of the second region labeling frame corresponding to the $i^{th}$ first region labeling frame on the second coordinate axis of the second coordinate system is the first end point value.

In step S514, when one side close to the fourth side of the $i^{th}$ first region labeling frame is not provided with a first region labeling frame adjacent to the $i^{th}$ first region labeling frame in the second direction or when an intersection of a coordinate interval formed by coordinate values of two vertexes of the first side or the second side of the first region labeling frame adjacent to the $i^{th}$ first region labeling frame in the second direction and located on one side close to the fourth side of the $i^{th}$ first region labeling frame on the second coordinate axis of the second coordinate system and the third coordinate interval is empty, expansion processing is performed on the first side and the second side of the $i^{th}$ first region labeling frame in the second direction to determine the fourth side of the second region labeling frame corresponding to the $i^{th}$ first region labeling frame. Herein, a coordinate value of two vertexes of the fourth side of the second region labeling frame corresponding to the $i^{th}$ first region labeling frame on the second coordinate axis of the second coordinate system is the second end point value.

In step S515, when one side close to the third side of the $j^{th}$ first region labeling frame is not provided with a first region labeling frame adjacent to the $j^{th}$ first region labeling frame in the second direction or when an intersection of a coordinate interval formed by coordinate values of two vertexes of the first side or the second side of the first region labeling frame adjacent to the $j^{th}$ first region labeling frame in the second direction and located on one side close to the third side of the $j^{th}$ first region labeling frame on the second coordinate axis of the second coordinate system and the third coordinate interval is empty, expansion processing is performed on the first side and the second side of the $j^{th}$ first region labeling frame in the second direction to determine the third side of the second region labeling frame corresponding to the $j^{th}$ first region labeling frame. Herein, a coordinate value of two vertexes of the third side of the second region labeling frame corresponding to the $j^{th}$ first region labeling frame on the second coordinate axis of the second coordinate system is the first end point value.

In step S516, when one side close to the fourth side of the $j^{th}$ first region labeling frame is not provided with a first region labeling frame adjacent to the $j^{th}$ first region labeling frame in the second direction or when an intersection of a coordinate interval formed by coordinate values of two vertexes of the first side or the second side of the first region labeling frame adjacent to the $j^{th}$ first region labeling frame in the second direction and located on one side close to the fourth side of the $j^{th}$ first region labeling frame on the second coordinate axis of the second coordinate system and the third coordinate interval is empty, expansion processing is performed on the first side and the second side of the $j^{th}$ first region labeling frame in the second direction to determine the fourth side of the second region labeling frame corresponding to the $j^{th}$ first region labeling frame. Herein, a coordinate value of two vertexes of the fourth side of the second region labeling frame corresponding to the $j^{th}$ first region labeling frame on the second coordinate axis of the second coordinate system is the second end point value.

Figure 3A:
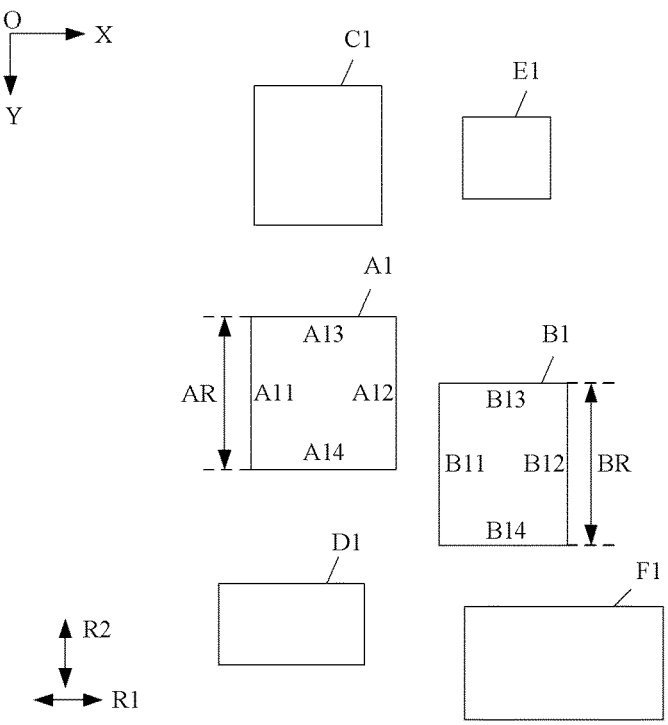
FIG. 3A is a schematic diagram of another plurality of first region labeling frames according to at least one embodiment of the disclosure.
Figure 3B:
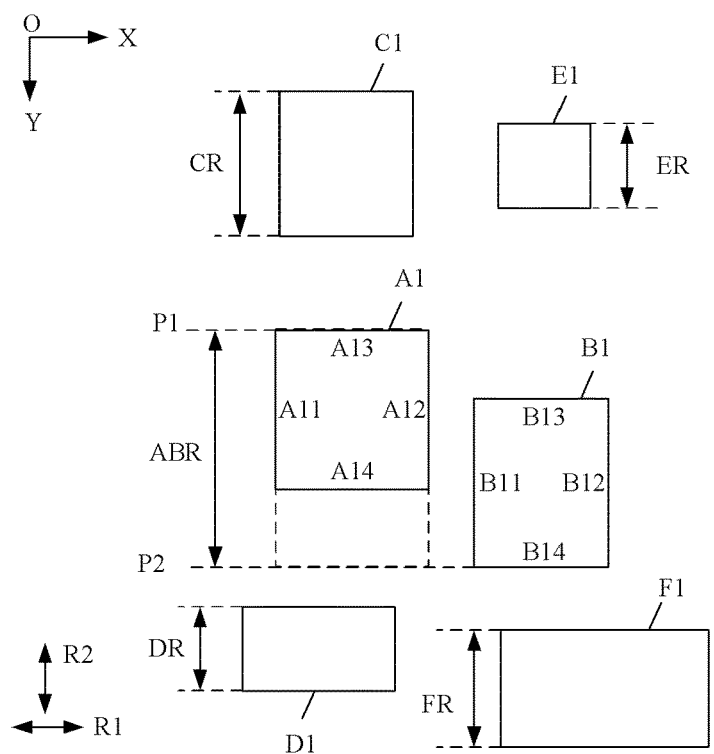
FIG. 3B is a schematic diagram of expansion processing performed on two first region labeling frames adjacent to each other as shown in FIG. 3A.
Figure 3C:
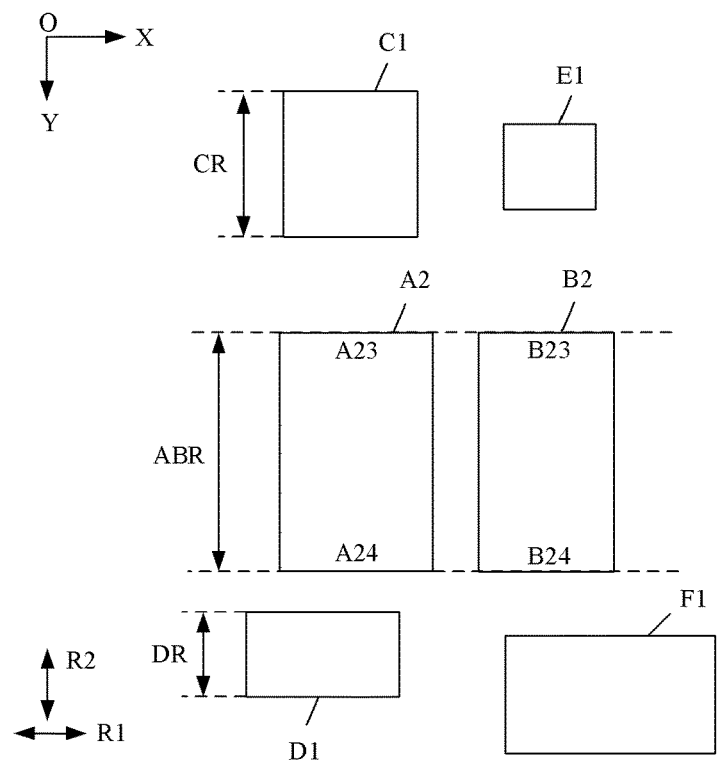
FIG. 3C is a schematic diagram of the corresponding second region labeling frames which are obtained after expansion processing is performed on the two first region labeling frames adjacent to each other in a first direction as shown in FIG. 3A.
Figure 3D:
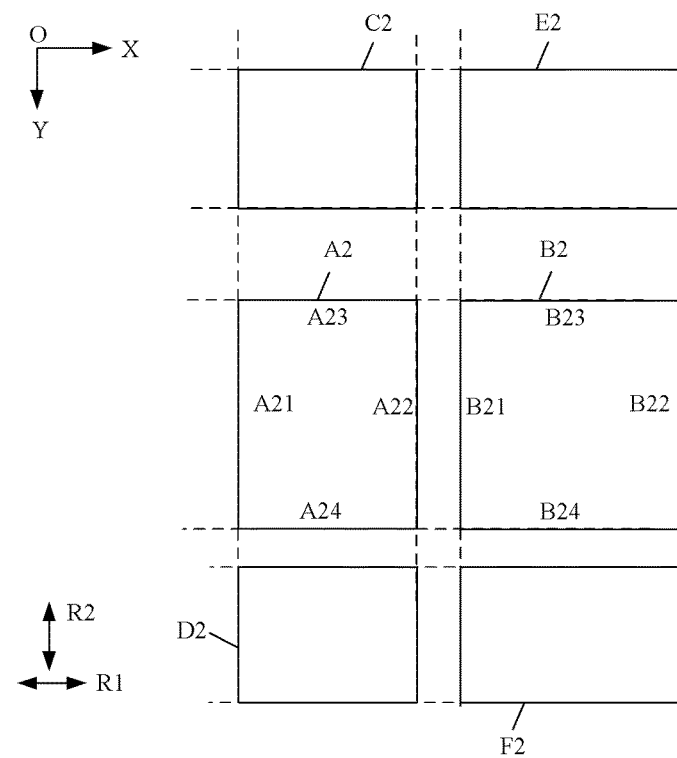
FIG. 3D is a schematic diagram of the corresponding second region labeling frames which are obtained after expansion processing is performed on the first region labeling frames in FIG. 3A.

FIG. 3A is a schematic diagram of another plurality of first region labeling frames according to at least one embodiment of the disclosure. FIG. 3B is a schematic diagram of expansion processing performed on two adjacent first region labeling frames shown in FIG. 3A. FIG. 3C is a schematic diagram of the corresponding second region labeling frames which are obtained after expansion processing is performed on the two first region labeling frames adjacent to each other in the first direction as shown in FIG. 3A. FIG. 3D is a schematic diagram of the corresponding second region labeling frames which are obtained after expansion processing is performed on the first region labeling frames in FIG. 3A.

For instance, as shown in FIG. 3A, the first region labeling frames A1, B1, C1, D1, E1, and F1 are arranged in a plurality of rows and a plurality of columns (e.g., arranged in three rows and two columns) in the first direction R1 and the second direction R2. For instance, taking the first region labeling frames A1 and B1 as an example, the first region labeling frame A1 includes the first side A11 and the second side A12 opposite to each other in the first direction R1 and the third side A13 and the fourth side A14 opposite to each other in the second direction R2, and the first region labeling frame B1 includes the first side B11 and the second side B12 opposite to each other in the first direction R1 and the third side B13 and the fourth side B14 opposite to each other in the second direction R2.

For instance, after expansion processing is performed on the first region labeling frames A1, B1, C1, D1, E1, and F1 in the first direction R1 and the second direction R2, the second region labeling frames A2, B2, C2, D2, E2, and F2 shown in FIG. 3D may be obtained. As shown in FIG. 3D, the second region labeling frame A2 which is obtained after expansion processing is performed on the first region labeling frame A1 includes the first side A21 and the second side A22 opposite to each other in the first direction R1 and the third side A23 and the fourth side A24 opposite to each other in the second direction R2, and the second region labeling frame B2 which is obtained after expansion processing is performed on the first region labeling frame B1 includes the first side B21 and the second side B22 opposite to each other in the first direction R1 and the third side B23 and the fourth side B24 opposite to each other in the second direction R2. As shown in FIG. 3D, the expanded second region labeling frames A2, B2, C2, D2, E2, and F2 are orderly arranged in the first direction R1 and the second direction R2.

Note that in the examples shown in FIG. 3A to FIG. 3D, the number of the first region labeling frames is exemplary only. In some other embodiments of the disclosure, the input image may also include more or fewer object regions, and correspondingly, the number of first region labeling frames may also be 3, 4, 5, 7, or more, and description thereof is not repeated. Further, the arrangement of the first region labeling frames A1, B1, C1, D1, E1, and F1 shown in FIG. 3A is exemplary only, which is not limited by the embodiments of the disclosure.

Note that in the embodiments of the disclosure, as the first region labeling frames are arranged in plural rows in the first direction R1 and the second direction R2, the adjacent two first region labeling frames in the first direction R1 are required to satisfy the following conditions. In the first direction R1, another first region labeling frame is not provided between the two first region labeling frames, and an intersection of the interval formed by the coordinate values of the two vertexes of the first side or the second side of one first region labeling frame between the two first region labeling frames on the second coordinate axis of the second coordinate system and the interval formed by the coordinate values of the two vertexes of the first side or the second side of the other first region labeling frame on the second coordinate axis of the second coordinate system is provided and the intersection is not empty. In the second direction R2, the adjacent two first region labeling frames are required to satisfy the following conditions. In the second direction R2, another first region labeling frame is not provided between the two first region labeling frames, and an intersection of the interval formed by the coordinate values of the two vertexes of the third side or the fourth side of one first region labeling frame between the two first region labeling frames on the first coordinate axis of the second coordinate system and the interval formed by the coordinate values of the two vertexes of the third side or the fourth side of the other first region labeling frame on the first coordinate axis of the second coordinate system is provided and the intersection is not empty. For instance, as shown in the example of FIG. 3A, the first region labeling frames C1 and E1 may be treated as two first region labeling frames adjacent to each other in the first direction R1, the first region labeling frames A1 and B1 may be treated as two first region labeling frames adjacent to each other in the first direction R1, and the rest may be deduced by analogy. The first region labeling frames C1 and A1 may be treated as two first region labeling frames adjacent to each other in the second direction R2, and the first region labeling frames A1 and D1 may be treated as two first region labeling frames adjacent to each other in the second direction R2. The rest may be deduced by analogy, and description thereof is not repeated.

For instance, taking the first region labeling frame A1 treated as the $i^{th}$ first region labeling frame and the first region labeling frame B1 treated as the $j^{th}$ first region labeling frame as an example, in step S511, the first region labeling frame A1 and the first region labeling frame B1 adjacent to each other in the first direction R1 are obtained.

For instance, with reference to FIG. 3A to FIG. 3D together, in step S512, the coordinate interval formed by coordinate values of the two vertexes of the first side A11 or the second side A12 of the first region labeling frame A1 on the second coordinate axis Y of the second coordinate system OXY is obtained to act as the first coordinate interval AR, and the coordinate interval formed by coordinate values of the two vertexes of the first side B11 or the second side B12 of the first region labeling frame B1 on the second coordinate axis Y of the second coordinate system OXY is obtained to act as the second coordinate interval BR. The union of the first coordinate interval AR and the second coordinate interval BR is taken to obtain the third coordinate interval ABR.

For instance, the third coordinate interval ABR includes a first end point value P1 and a second end point value P2. Compared to a coordinate value of the fourth side A14 of the first region labeling frame A1 on the second coordinate axis Y of the second coordinate system OXY, a coordinate value of the third side A13 of the first region labeling frame A1 on the second coordinate axis Y of the second coordinate system OXY is closer to the first end point value P1. Compared to a coordinate value of the fourth side B14 of the first region labeling frame B1 on the second coordinate axis Y of the second coordinate system OXY, a coordinate value of the third side B13 of the first region labeling frame B1 on the second coordinate axis Y of the second coordinate system OXY is closer to the first end point value P1. Based on the second coordinate system OXY shown in FIG. 3A, the first end point value P1 is less than the second end point value P2.

For instance, in the examples shown in FIG. 3A to FIG. 3D, the first end point value P1 of the third coordinate interval ABR is selected between the coordinate value of the third side A13 of the first region labeling frame A1 on the second coordinate axis Y of the second coordinate system OXY and the coordinate value of the third side B13 of the first region labeling frame B1 on the second coordinate axis Y of the second coordinate system OXY. For instance, in the examples shown in FIG. 3A to FIG. 3D, the first end point value P1 of the third coordinate interval ABR is the coordinate value of the third side A13 of the first region labeling frame A1 on the second coordinate axis Y of the second coordinate system OXY. The second end point value P2 of the third coordinate interval ABR is selected between the coordinate value of the fourth side A14 of the first region labeling frame A1 on the second coordinate axis Y of the second coordinate system OXY and the coordinate value of the fourth side B14 of the first region labeling frame B1 on the second coordinate axis Y of the second coordinate system OXY. For instance, in the examples shown in FIG. 3A to FIG. 3D, the second end point value P2 of the third coordinate interval ABR is the coordinate value of the fourth side B14 of the first region labeling frame B1 on the second coordinate axis Y of the second coordinate system OXY, so that the first coordinate interval AR and the second coordinate interval BR are both included in the third coordinate interval ABR. Note that the disclosure is not limited thereto. In some other embodiments, the first end point value P1 and the second end point value P2 of the third coordinate interval ABR may respectively be the coordinate values of the third side A13 and the fourth side A14 of the first region labeling frame A1 on the second coordinate axis Y of the second coordinate system OXY. Alternatively, the first end point value P1 and the second end point value P2 of the third coordinate interval ABR may respectively be the coordinate values of the third side B13 and the fourth side B14 of the first region labeling frame B1 on the second coordinate axis Y of the second coordinate system OXY.

For instance, in step S513, when an intersection of a coordinate interval CR formed by the coordinate values of the two vertexes of the first side or the second side of the first region labeling frame C1 adjacent to the first region labeling frame A1 in the second direction R2 and located on one side close to the third side A13 of the first region labeling frame A1 on the second coordinate axis Y of the second coordinate system OXY and the third coordinate interval ABR is empty, expansion processing is performed on the first side A11 and the second side A12 of the first region labeling frame A1 in the second direction R2 to determine the third side A23 of the second region labeling frame A2 corresponding to the first region labeling frame A1.

For instance, the coordinate value of the third side A23 of the second region labeling frame A2 corresponding to the first region labeling frame A1 on the second coordinate axis Y of the second coordinate system OXY is the first end point value P1 of the third coordinate interval ABR.

As shown in FIG. 3B and FIG. 3C, in step S513, when the intersection of the coordinate interval CR formed by the coordinate values of the two vertexes of the first side or the second side of the first region labeling frame C1 on the second coordinate axis Y of the second coordinate system OXY and the third coordinate interval ABR is empty, one end (i.e., the end close to the first region labeling frame C1) of each of the first side A11 and the second side A12 of the first region labeling frame A1 may extend to a position of the first end point value P1 of the third coordinate interval ABR in the second direction R2. A position of the third side A23 of the second region labeling frame A2 after the expansion processing is thereby determined. Note that as shown in FIG. 3B and FIG. 3C, since the first end point value P1 of the third coordinate interval ABR is the coordinate value of the third side A13 of the first region labeling frame A1 on the second coordinate axis Y of the second coordinate system OXY, one end of each of the first side A11 and the second side A12 of the first region labeling frame A1 does not extend.

For instance, in step S514, when an intersection of a coordinate interval DR formed by the coordinate values of the two vertexes of the first side or the second side of the first region labeling frame D1 adjacent to the first region labeling frame A1 in the second direction R2 and located on one side close to the fourth side A14 of the first region labeling frame A1 on the second coordinate axis Y of the second coordinate system OXY and the third coordinate interval ABR is empty, expansion processing is performed on the first side A11 and the second side A12 of the first region labeling frame A1 in the second direction R2 to determine the fourth side A24 of the second region labeling frame A2 corresponding to the first region labeling frame A1.

For instance, the coordinate value of the fourth side A24 of the second region labeling frame A2 corresponding to the first region labeling frame A1 on the second coordinate axis Y of the second coordinate system OXY is the second end point value P2 of the third coordinate interval ABR.

As shown in FIG. 3B and FIG. 3C, in step S514, when the intersection of the coordinate interval DR formed by the coordinate values of the two vertexes of the first side or the second side of the first region labeling frame D1 on the second coordinate axis Y of the second coordinate system OXY and the third coordinate interval ABR is empty, the other end (i.e., the end close to the first region labeling frame D1) of each of the first side A11 and the second side A12 of the first region labeling frame A1 may extend to a position of the second end point value P2 of the third coordinate interval ABR in the second direction R2. A position of the fourth side A24 of the second region labeling frame A2 after the expansion processing is thereby determined.

Accordingly, as shown in FIG. 3C, the interval formed by the coordinate values of the third side A23 and the fourth side A24 of the second region labeling frame A2 on the second coordinate axis Y of the second coordinate system OXY is equivalent to the third coordinate interval ABR. As such, the corresponding table region labeling frame which is subsequently obtained based on the second region labeling frame A2 may be regular and orderly.

For instance, in step S515, when an intersection of a coordinate interval ER formed by the coordinate values of the two vertexes of the first side or the second side of the first region labeling frame E1 adjacent to the first region labeling frame B1 in the second direction R2 and located on one side close to the third side B13 of the first region labeling frame B1 on the second coordinate axis Y of the second coordinate system OXY and the third coordinate interval ABR is empty, expansion processing is performed on the first side B11 and the second side B12 of the first region labeling frame B1 in the second direction R2 to determine the third side B23 of the second region labeling frame B2 corresponding to the first region labeling frame B1.

For instance, the coordinate value of the third side B23 of the second region labeling frame B2 corresponding to the first region labeling frame B1 on the second coordinate axis Y of the second coordinate system OXY is the first end point value P1 of the third coordinate interval ABR.

For instance, in step S516, when an intersection of a coordinate interval FR formed by the coordinate values of the two vertexes of the first side or the second side of the first region labeling frame F1 adjacent to the first region labeling frame B1 in the second direction R2 and located on one side close to the fourth side B14 of the first region labeling frame B1 on the second coordinate axis Y of the second coordinate system OXY and the third coordinate interval ABR is empty, expansion processing is performed on the first side B11 and the second side B12 of the first region labeling frame B1 in the second direction R2 to determine the fourth side B24 of the second region labeling frame B2 corresponding to the first region labeling frame B1.

For instance, the coordinate value of the fourth side B24 of the second region labeling frame B2 corresponding to the first region labeling frame B1 on the second coordinate axis Y of the second coordinate system OXY is the second end point value P2 of the third coordinate interval ABR.

For instance, specific content of steps S515 and S516 regarding the expansion processing performed on the first side B11 and the second side B12 of the first region labeling frame B1 in the second direction R2 may be found with reference to the corresponding description of steps S513 and S514 as described above, and repeated description is not provided herein.

For instance, as shown in FIG. 3C, after the expansion processing is performed, in the second direction R2, the third side A23 of the second region labeling frame A2 and the third side B23 of the second region labeling frame B2 are aligned, and the fourth side A24 of the second region labeling frame A2 and the fourth side B24 of the second region labeling frame B2 are aligned. That is, the third side A23 of the second region labeling frame A2 and the third side B23 of the second region labeling frame B2 are located on the same horizontal line, and the fourth side A24 of the second region labeling frame A2 and the fourth side B24 of the second region labeling frame B2 are located on the same horizontal line. In this way, the corresponding table region labeling frames which are subsequently obtained based on the second region labeling frames A2 and B2 may be regular and orderly.

For instance, in some other embodiments, step S50 may further include the following steps S521 to S524.

In step S521, when an intersection of the coordinate interval formed by the coordinate values of the two vertexes of the first side or the second side of the first region labeling frame adjacent to the $i^{th}$ first region labeling frame in the second direction and located on one side close to the third side of the $i^{th}$ h first region labeling frame on the second coordinate axis of the second coordinate system and the third coordinate interval is provided and the intersection is not empty, expansion processing is performed on the first side and the second side of the $i^{th}$ first region labeling frame in the second direction to determine the third side of the second region labeling frame corresponding to the $i^{th}$ first region labeling frame. Herein, the third side of the second region labeling frame corresponding to the $i^{th}$ first region labeling frame is adjacent to and directly contacts the fourth side of the first region labeling frame adjacent to the $i^{th}$ first region labeling frame in the second direction and located on one side close to the third side of the $i^{th}$ first region labeling frame.

In step S522, when an intersection of the coordinate interval formed by the coordinate values of the two vertexes of the first side or the second side of the first region labeling frame adjacent to the $i^{th}$ first region labeling frame in the second direction and located on one side close to the fourth side of the $i^{th}$ first region labeling frame on the second coordinate axis of the second coordinate system and the third coordinate interval is provided and the intersection is not empty, expansion processing is performed on the first side and the second side of the $i^{th}$ first region labeling frame in the second direction to determine the fourth side of the second region labeling frame corresponding to the $i^{th}$ first region labeling frame. Herein, the fourth side of the second region labeling frame corresponding to the $i^{th}$ first region labeling frame is adjacent to and directly contacts the third side of the first region labeling frame adjacent to the $i^{th}$ first region labeling frame in the second direction and located on one side close to the fourth side of the $i^{th}$ first region labeling frame.

In step S523, when an intersection of the coordinate interval formed by the coordinate values of the two vertexes of the first side or the second side of the first region labeling frame adjacent to the $j^{th}$ first region labeling frame in the second direction and located on one side close to the third side of the $j^{th}$ first region labeling frame on the second coordinate axis of the second coordinate system and the third coordinate interval is provided and the intersection is not empty, expansion processing is performed on the first side and the second side of the $j^{th}$ first region labeling frame in the second direction to determine the third side of the second region labeling frame corresponding to the $j^{th}$ first region labeling frame. Herein, the third side of the second region labeling frame corresponding to the $j^{th}$ first region labeling frame is adjacent to and directly contacts the fourth side of the first region labeling frame adjacent to the $j^{th}$ first region labeling frame in the second direction and located on one side close to the third side of the $j^{th}$ first region labeling frame.

In step S524, when an intersection of the coordinate interval formed by the coordinate values of the two vertexes of the first side or the second side of the first region labeling frame adjacent to the $j^{th}$ first region labeling frame in the second direction and located on one side close to the fourth side of the $j^{th}$ first region labeling frame on the second coordinate axis of the second coordinate system and the third coordinate interval is provided and the intersection is not empty, expansion processing is performed on the first side and the second side of the $j^{th}$ first region labeling frame in the second direction to determine the fourth side of the second region labeling frame corresponding to the $j^{th}$ first region labeling frame. Herein, the fourth side of the second region labeling frame corresponding to the $j^{th}$ first region labeling frame is adjacent to and directly contacts the third side of the first region labeling frame adjacent to the $j^{th}$ first region labeling frame in the second direction and located on one side close to the fourth side of the $j^{th}$ first region labeling frame.

For instance, description of steps S521 and S524 may be found with reference to the examples shown in FIG. 4A to FIG. 4D.

Figure 4A:
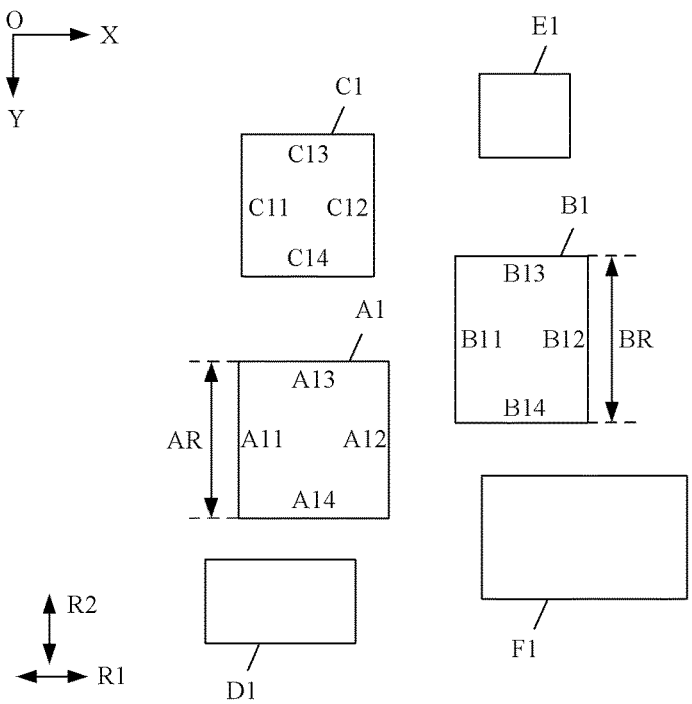
FIG. 4A is a schematic diagram of still another plurality of first region labeling frames according to at least one embodiment of the disclosure.
Figure 4B:
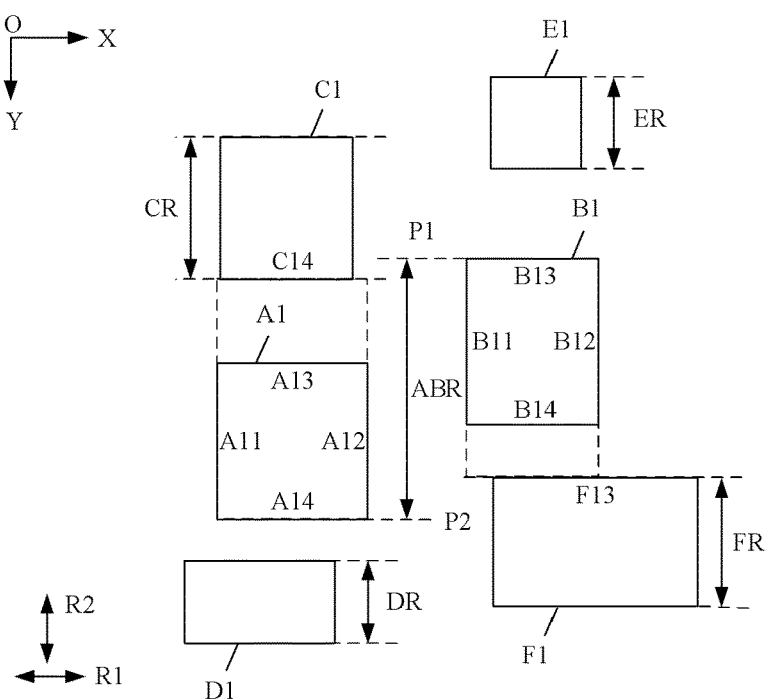
FIG. 4B is a schematic diagram of expansion processing performed on two first region labeling frames adjacent to each other as shown in FIG. 4A.
Figure 4C:
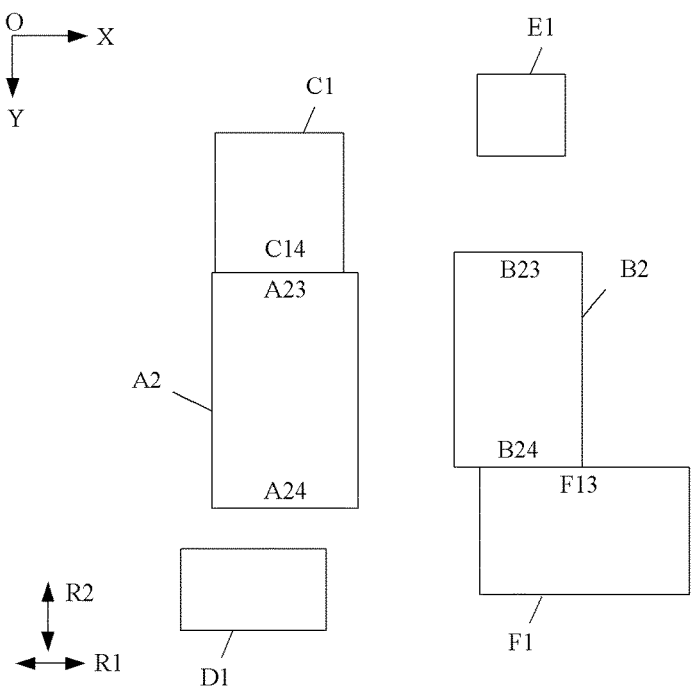
FIG. 4C is a schematic diagram of the corresponding second region labeling frames which are obtained after expansion processing is performed on the two first region labeling frames adjacent to each other in the first direction as shown in FIG. 4A.
Figure 4D:
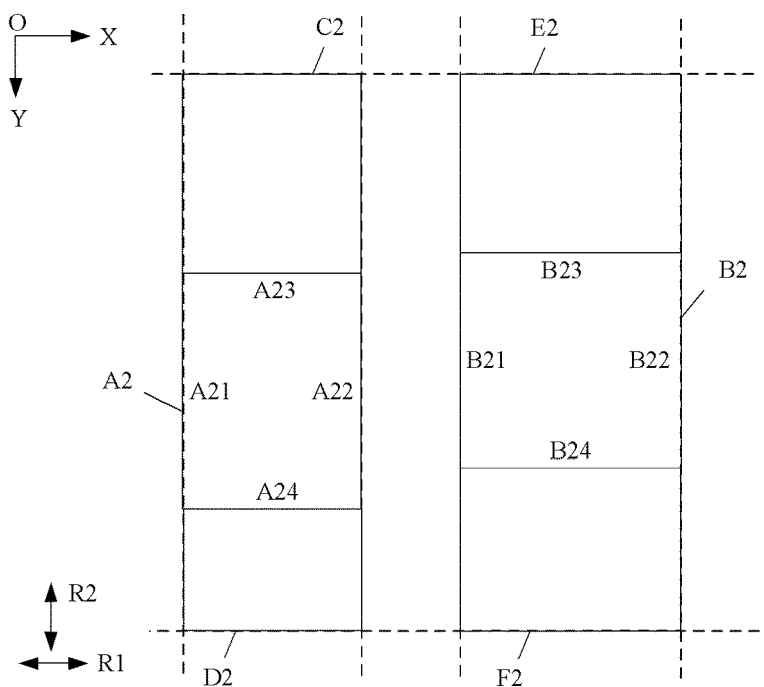
FIG. 4D is a schematic diagram of the corresponding second region labeling frames which are obtained after expansion processing is performed on the first region labeling frames in FIG. 4A.

FIG. 4A is a schematic diagram of still another plurality of first region labeling frames according to at least one embodiment of the disclosure. FIG. 4B is a schematic diagram of expansion processing performed on two first region labeling frames adjacent to each other as shown in FIG. 4A. FIG. 4C is a schematic diagram of the corresponding second region labeling frames which are obtained after expansion processing is performed on the two first region labeling frames adjacent to each other in the first direction as shown in FIG. 4A. FIG. 4D is a schematic diagram of the corresponding second region labeling frames which are obtained after expansion processing is performed on the first region labeling frames in FIG. 4A.

For instance, as shown in FIG. 4A, the first region labeling frames A1, B1, C1, D1, E1, and F1 are arranged in a plurality of rows and a plurality of columns (e.g., arranged in three rows and two columns) in the first direction R1 and the second direction R2. For instance, taking the first region labeling frames A1 and B1 as an example, the first region labeling frame A1 includes the first side A11 and the second side A12 opposite to each other in the first direction R1 and the third side A13 and the fourth side A14 opposite to each other in the second direction R2, and the first region labeling frame B1 includes the first side B11 and the second side B12 opposite to each other in the first direction R1 and the third side B13 and the fourth side B14 opposite to each other in the second direction R2.

For instance, after expansion processing is performed on the first region labeling frames A1, B1, C1, D1, E1, and F1 in the first direction R1 and the second direction R2, the second region labeling frames A2, B2, C2, D2, E2, and F2 shown in FIG. 4D may be obtained. As shown in FIG. 4D, the second region labeling frame A2 which is obtained after expansion processing is performed on the first region labeling frame A1 includes the first side A21 and the second side A22 opposite to each other in the first direction R1 and the third side A23 and the fourth side A24 opposite to each other in the second direction R2, and the second region labeling frame B2 which is obtained after expansion processing is performed on the first region labeling frame B1 includes the first side B21 and the second side B22 opposite to each other in the first direction R1 and the third side B23 and the fourth side B24 opposite to each other in the second direction R2. As shown in FIG. 4D, the expanded second region labeling frames A2, B2, C2, D2, E2, and F2 are orderly arranged in the first direction R1 and the second direction R2.

For instance, as shown in the example of FIG. 4A, the first region labeling frames C1 and E1 may be treated as two first region labeling frames adjacent to each other in the first direction R1, and the first region labeling frames C1 and B1 may be treated as two first region labeling frames adjacent to each other in the first direction R1. The first region labeling frames A1 and B1 may be treated as two first region labeling frames adjacent to each other in the first direction R1, and the rest may be deduced by analogy. The first region labeling frames C1 and A1 may be treated as two first region labeling frames adjacent to each other in the second direction R2, the first region labeling frames A1 and D1 may be treated as two first region labeling frames adjacent to each other in the second direction R2, and the rest may be deduced by analogy.

For instance, taking the first region labeling frame A1 treated as the $i^{th}$ first region labeling frame and the first region labeling frame B1 treated as the $j^{th}$ first region labeling frame as an example, steps S521 to S524 are performed.

For instance, in step S521, when an intersection of the coordinate interval CR formed by the coordinate values of the two vertexes of the first side or the second side of the first region labeling frame C1 adjacent to the first region labeling frame A1 in the second direction R2 and located on one side close to the third side A13 of the first region labeling frame A1 on the second coordinate axis Y of the second coordinate system OXY and the third coordinate interval ABR is provided and the intersection is not empty, expansion processing is performed on the first side A11 and the second side A12 of the first region labeling frame A1 in the second direction R2 to determine the third side A23 of the second region labeling frame A2 corresponding to the first region labeling frame A1.

For instance, as shown in FIGS. 4B and 4C, in an embodiment, the coordinate value of a fourth side C14 of the first region labeling frame C1 on the second coordinate axis Y of the second coordinate system OXY is located inside the third coordinate interval ABR. Herein, after expansion processing is performed on the first side A11 and the second side A12 of the first region labeling frame A1 in the second direction R2, the third side A23 of the second region labeling frame A2 corresponding to the first region labeling frame A1 is adjacent to and directly contacts the fourth side C14 of the first region labeling frame C1.

As shown in FIG. 4B and FIG. 4C, in step S521, when an intersection of the coordinate interval CR formed by the coordinate values of the two vertexes of the first side or the second side of the first region labeling frame C1 on the second coordinate axis Y of the second coordinate system OXY and the third coordinate interval ABR is provided and the intersection is not empty, that is, when the coordinate value of the vertexes of the third side and/or the fourth side of the first region labeling frame C1 on the second coordinate axis Y of the second coordinate system OXY is located inside the third coordinate interval ABR, one end (i.e., the end close to the first region labeling frame C1) of each of the first side A11 and the second side A12 of the first region labeling frame A1 extends to a position of the fourth side C14 (i.e., the side of the first region labeling frame C1 close to the first region labeling frame A1) of the first region labeling frame C1 in the second direction R2. In this way, the third side A23 of the expanded second region labeling frame A2 overlaps the fourth side C14 of the first region labeling frame C1. As such, the region surrounded by the expanded second region labeling frame A2 is prevented from overlapping the region surrounded by the first region labeling frame C1.

For instance, in the examples shown in FIG. 4A to FIG. 4D, when the intersection of the coordinate interval DR formed by the coordinate values of the two vertexes of the first side or the second side of the first region labeling frame D1 adjacent to the first region labeling frame A1 in the second direction R2 and located on one side close to the fourth side A14 of the first region labeling frame A1 on the second coordinate axis Y of the second coordinate system OXY and the third coordinate interval ABR is empty, expansion processing is performed on the first side A11 and the second side A12 of the first region labeling frame A1 in the second direction R2 to determine the fourth side A24 of the second region labeling frame A2 corresponding to the first region labeling frame A1. For instance, the coordinate value of the fourth side A24 of the second region labeling frame A2 corresponding to the first region labeling frame A1 on the second coordinate axis Y of the second coordinate system OXY is the second end point value P2 of the third coordinate interval ABR.

For instance, as shown in the examples of FIG. 4A to FIG. 4D, when the intersection of the coordinate interval ER formed by the coordinate values of the two vertexes of the first side or the second side of the first region labeling frame E1 adjacent to the first region labeling frame B1 in the second direction R2 and located on one side close to the third side B13 of the first region labeling frame B1 on the second coordinate axis Y of the second coordinate system OXY and the third coordinate interval ABR is empty, expansion processing is performed on the first side B11 and the second side B12 of the first region labeling frame B1 in the second direction R2 to determine the third side B23 of the second region labeling frame B2 corresponding to the first region labeling frame B1. For instance, the coordinate value of the third side B23 of the second region labeling frame B2 corresponding to the first region labeling frame B1 on the second coordinate axis Y of the second coordinate system OXY is the first end point value P1 of the third coordinate interval ABR.

For instance, as shown in FIG. 4B and FIG. 4C, in step S524, when an intersection of the coordinate interval FR formed by the coordinate values of the two vertexes of the first side or the second side of the first region labeling frame F1 adjacent to the first region labeling frame B1 in the second direction R2 and located on one side close to the fourth side B14 of the first region labeling frame B1 on the second coordinate axis Y of the second coordinate system OXY and the third coordinate interval ABR is provided and the intersection is not empty, expansion processing is performed on the first side B11 and the second side B12 of the first region labeling frame B1 in the second direction R2 to determine the fourth side B24 of the second region labeling frame B2 corresponding to the first region labeling frame B1.

For instance, as shown in FIG. 4B, in an embodiment, the coordinate value of a third side F13 of the first region labeling frame F1 on the second coordinate axis Y of the second coordinate system OXY is located inside the third coordinate interval ABR. Herein, after expansion processing is performed on the first side B11 and the second side B12 of the first region labeling frame B1 in the second direction R2, the fourth side B24 of the second region labeling frame B2 corresponding to the first region labeling frame B1 is adjacent to and directly contacts the third side F14 of the first region labeling frame F1.

As shown in FIG. 4B and FIG. 4C, in step S524, when an intersection of the coordinate interval FR formed by the coordinate values of the two vertexes of the first side or the second side of the first region labeling frame F1 on the second coordinate axis Y of the second coordinate system OXY and the third coordinate interval ABR is provided and the intersection is not empty, that is, when the coordinate value of the vertexes of the third side and/or the fourth side of the first region labeling frame F1 on the second coordinate axis Y of the second coordinate system OXY is located inside the third coordinate interval ABR, the other end (i.e., the end close to the first region labeling frame F1) of each of the first side B11 and the second side B12 of the first region labeling frame B1 extends to a position of the third side F13 of the first region labeling frame F1 in the second direction R2. In this way, the fourth side A24 of the expanded second region labeling frame B2 overlaps the third side F13 of the first region labeling frame F1. As such, the region surrounded by the expanded second region labeling frame B2 is prevented from overlapping the region surrounded by the first region labeling frame F1.

For instance, as shown in FIG. 4C, after the expansion processing is performed, in the second direction R2, the third side A23 of the second region labeling frame A2 and the fourth side C14 of the first region labeling frame C1 overlap. The coordinate value of the vertexes the fourth side A24 of the second region labeling frame A2 on the second coordinate axis Y of the second coordinate system OXY is equal to the second end point value P2 of the third coordinate interval ABR, and the coordinate value of the vertexes the third side B23 of the second region labeling frame B2 on the second coordinate axis Y of the second coordinate system OXY is equal to the first end point value P1 of the third coordinate interval ABR. The fourth side B24 of the second region labeling frame B2 overlaps the third side F13 of the first region labeling frame F1. As such, when expansion processing is performed on the first region labeling frames A1 and B1 to obtain the corresponding expanded second region labeling frames A2 and B2, the adjacent expanded second region labeling frames are also prevented from overlapping each other. The corresponding table region labeling frame which is subsequently obtained based on the second region labeling frame may thus be regular and orderly.

Note that the first region labeling frame B1 is adjacent to both the first region labeling frame A1 and the first region labeling frame C1 in the first direction R1. As such, when expansion processing is performed on the first region labeling frame B1 in the second direction R2, the expansion processing may be performed on the first region labeling frames A1 and B1 first in the second direction R2 (with reference to the corresponding content provided in the embodiments of FIG. 4A to FIG. 4D, for example), or the expansion processing may be performed on the first region labeling frames B1 and C1 first in the second direction R2, which is not limited by the embodiments of the disclosure.

Figure 4E:
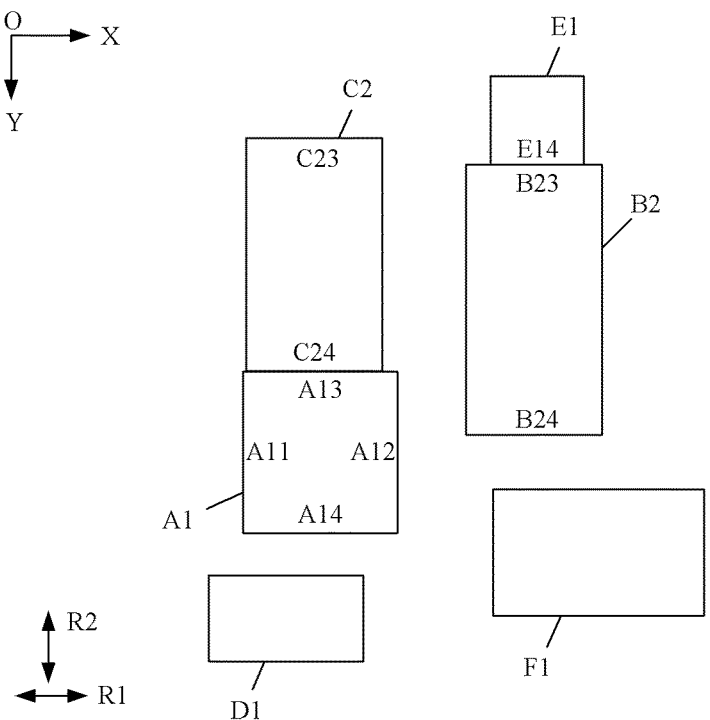
FIG. 4E is another schematic diagram of the corresponding second region labeling frames which are obtained after expansion processing is performed on the two first region labeling frames adjacent to each other in the first direction as shown in FIG. 4A.

For instance, in the case that the expansion processing is performed on the first region labeling frames B1 and C1 first in the second direction R2 based on what is shown in FIG. 4A, the second region labeling frames B2 and C2 shown in FIG. 4E may be obtained. For instance, the first side C11 and the second side C12 of the first region labeling frame C1 are expanded in the second direction R2, so that the obtained corresponding fourth side C24 of the second region labeling frame C2 is adjacent to and directly contacts the third side A13 of the first region labeling frame A1. The first side B11 and the second side B12 of the first region labeling frame B1 are expanded in the second direction R2, so that the obtained corresponding third side B23 of the second region labeling frame B2 is adjacent to and directly contacts a fourth side E14 of the first region labeling frame E1. That is, when the expansion processing is performed on the first region labeling frames A1 and B1 in FIG. 4A first in the second direction R1, as shown in FIG. 4D, the first side A11 and the second side A12 of the first region labeling frame A1 are expanded in the second direction R2, and as such, the corresponding third side A23 of the second region labeling frame A2 is adjacent to and directly contacts the fourth side C14 of the first region labeling frame C1. When the expansion processing is performed on the first region labeling frames B1 and C1 in FIG. 4A first in the second direction R1, as shown in FIG. 4E, the first side C11 and the second side C12 of the first region labeling frame C1 are expanded in the second direction R2, and as such, the corresponding fourth side C24 of the second region labeling frame C2 is adjacent to and directly contacts the third side A13 of the first region labeling frame A1.

For instance, with reference to the embodiments shown in FIG. 3A to FIG. 3D and FIG. 4A to FIG. 4D, it can be seen that after expansion processing is performed on plural first region labeling frames in the second direction R2, the two second region labeling frames adjacent to each other in the second direction R2 among the plural obtained corresponding second region labeling frames may be connected to each other and are provided with a spacing therebetween. That is, the two sides adjacent to each other in the second direction R2 of the two second region labeling frames adjacent to each other in the second direction R2 may directly contact each other or may be provided with a specific gap therebetween. For instance, taking the second region labeling frames A2 and C2 adjacent to each other in the second direction R2 respectively in FIG. 3D and FIG. 4D as an example, as shown in FIG. 3D, a specific spacing is kept between the expanded second region labeling frames C2 and A2 in the second direction R2. That is, a specific gap is provided between the fourth side C24 of the second region labeling frame C2 and the third side A23 of the second region labeling frame A2, or the expanded second region labeling frames C2 and A2 may be connected to each other as shown in FIG. 4D. That is, the fourth side C24 of the second region labeling frame C2 is adjacent to and directly contacts the third side A23 of the second region labeling frame A2.

Figure 5A:
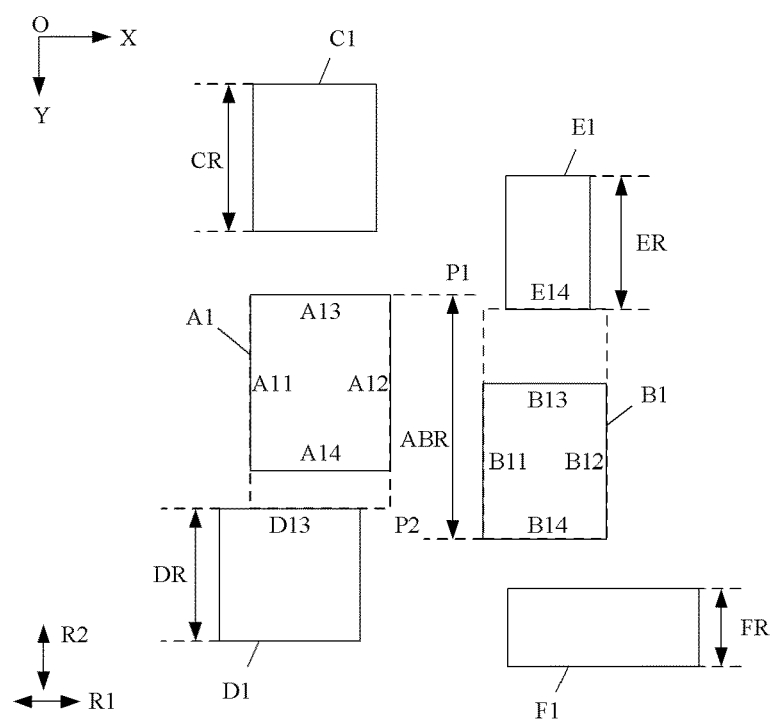
FIG. 5A is a schematic diagram of expansion processing performed on two first region labeling frames adjacent to each other in the first direction among the first region labeling frames according to at least one embodiment of the disclosure.
Figure 5B:
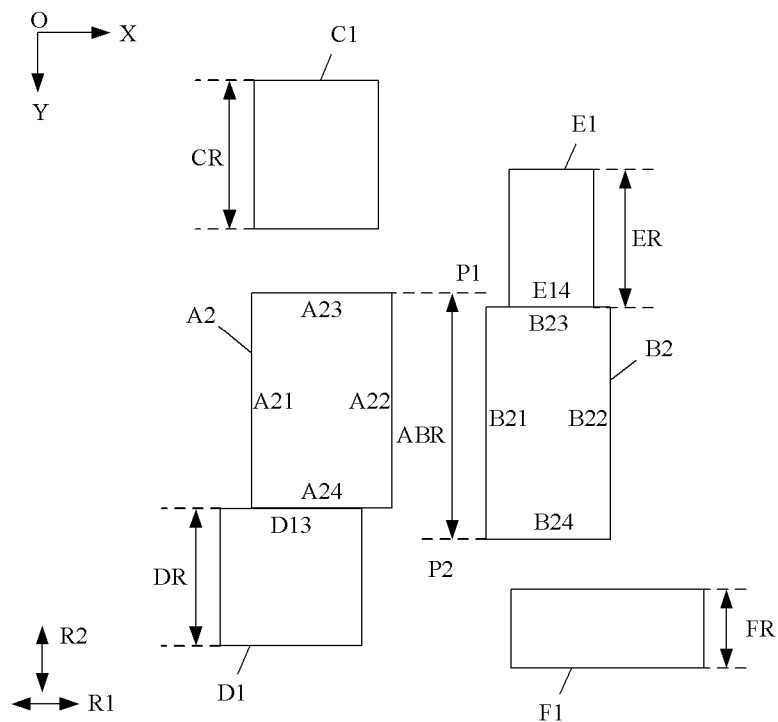
FIG. 5B is a schematic diagram of the corresponding second region labeling frames which are obtained after expansion processing is performed on the two first region labeling frames adjacent to each other in the first direction as shown in FIG. 5A.

For instance, description of steps S522 and S523 may be found with reference to the examples shown in FIG. 5A to FIG. 5B.

FIG. 5A is a schematic diagram of expansion processing performed on two first region labeling frames adjacent to each other in the first direction among the first region labeling frames according to at least one embodiment of the disclosure. FIG. 5B is a schematic diagram of the corresponding second region labeling frames which are obtained after expansion processing is performed on the two first region labeling frames adjacent to each other in the first direction as shown in FIG. 5A.

Note that description of the examples shown in FIG. 5A to FIG. 5B similar to or repeated in the examples shown in FIG. 4A to FIG. 4D is not provided herein.

For instance, taking the first region labeling frame A1 treated as the $i^{th}$ first region labeling frame and the first region labeling frame B1 treated as the $j^{th}$ first region labeling frame as an example, steps S521 to S524 are performed.

For instance, in the examples shown in FIG. 5A to FIG. 5B, when the intersection of the coordinate interval CR formed by the coordinate values of the two vertexes of the first side or the second side of the first region labeling frame C1 adjacent to the first region labeling frame A1 in the second direction R2 and located on one side close to the third side A13 of the first region labeling frame A1 on the second coordinate axis Y of the second coordinate system OXY and the third coordinate interval ABR is empty, expansion processing is performed on the first side A11 and the second side A12 of the first region labeling frame A1 in the second direction R2 to determine the third side A23 of the second region labeling frame A2 corresponding to the first region labeling frame A1. For instance, the coordinate value of the third side A23 of the second region labeling frame A2 corresponding to the first region labeling frame A1 on the second coordinate axis Y of the second coordinate system OXY is the first end point value P1 of the third coordinate interval ABR.

For instance, in step S522, when an intersection of the coordinate interval DR formed by the coordinate values of the two vertexes of the first side or the second side of the first region labeling frame D1 adjacent to the first region labeling frame A1 in the second direction R2 and located on one side close to the fourth side A14 of the first region labeling frame A1 on the second coordinate axis Y of the second coordinate system OXY and the third coordinate interval ABR is provided and the intersection is not empty, expansion processing is performed on the first side A11 and the second side A12 of the first region labeling frame A1 in the second direction R2 to determine the fourth side A24 of the second region labeling frame A2 corresponding to the first region labeling frame A1.

For instance, as shown in FIG. 5A and FIG. 5B, in an embodiment, the coordinate value of a third side D13 of the first region labeling frame D1 on the second coordinate axis Y of the second coordinate system OXY is located inside the third coordinate interval ABR. Herein, after expansion processing is performed on the first side A11 and the second side A12 of the first region labeling frame A1 in the second direction R2, the fourth side A24 of the second region labeling frame A2 corresponding to the first region labeling frame A1 is adjacent to and directly contacts the third side D13 of the first region labeling frame D1.

For instance, in step S523, when an intersection of the coordinate interval ER formed by the coordinate values of the two vertexes of the first side or the second side of the first region labeling frame E1 adjacent to the first region labeling frame B1 in the second direction R2 and located on one side close to the third side B13 of the first region labeling frame B1 on the second coordinate axis Y of the second coordinate system OXY and the third coordinate interval ABR is provided and the intersection is not empty, expansion processing is performed on the first side B11 and the second side B12 of the first region labeling frame B1 in the second direction R2 to determine the third side B23 of the second region labeling frame B2 corresponding to the first region labeling frame B1.

For instance, as shown in FIG. 5A and FIG. 5B, in an embodiment, the coordinate value of the fourth side E14 of the first region labeling frame E1 on the second coordinate axis Y of the second coordinate system OXY is located inside the third coordinate interval ABR. Herein, after expansion processing is performed on the first side B11 and the second side B12 of the first region labeling frame B1 in the second direction R2, the third side B23 of the second region labeling frame B2 corresponding to the first region labeling frame B1 is adjacent to and directly contacts the fourth side E14 of the first region labeling frame E1.

For instance, as shown in the examples of FIG. 5A to FIG. 5B, when the intersection of the coordinate interval FR formed by the coordinate values of the two vertexes of the first side or the second side of the first region labeling frame F1 adjacent to the first region labeling frame B1 in the second direction R2 and located on one side close to the fourth side B14 of the first region labeling frame B1 on the second coordinate axis Y of the second coordinate system OXY and the third coordinate interval ABR is empty, expansion processing is performed on the first side B11 and the second side B12 of the first region labeling frame B1 in the second direction R2 to determine the fourth side B24 of the second region labeling frame B2 corresponding to the first region labeling frame B1. For instance, the coordinate value of the fourth side B24 of the second region labeling frame B2 corresponding to the first region labeling frame B1 on the second coordinate axis Y of the second coordinate system OXY is the second end point value P2 of the third coordinate interval ABR.

For instance, as shown in FIG. 5B, the coordinate value of the vertexes of the third side A23 of the expanded second region labeling frame A2 in the second direction R2 on the second coordinate axis Y of the second coordinate system OXY is the identical to the first end point value P1 of the third coordinate interval ABR. The fourth side A24 of the second region labeling frame A2 overlaps the third side D13 of the first region labeling frame D1. After the expansion processing is performed, in the second direction R2, the third side B23 of the second region labeling frame B2 and the fourth side E14 of the first region labeling frame E1 overlap. The coordinate value of the vertexes the fourth side B24 of the second region labeling frame B2 on the second coordinate axis Y of the second coordinate system OXY is equal to the second end point value P2 of the third coordinate interval ABR.

Note that in the disclosure, in combination with the description of the expansion processing which is performed once on the first region labeling frame in the second direction R2 in FIG. 3A to FIG. 5B, the aforementioned expansion processing may be performed one or several times. Correspondingly, it may be understood that the region labeling frames A2 and B2 described above are the region labeling frames which are obtained after expansion processing is performed one time on the first region labeling frames A1 and B1 in the second direction R2, and expansion processing may be further performed on the region labeling frames A2 and B2 according to the actual situation. The second region labeling frames A2 and B2 corresponding to the first region labeling frames A1 and B1 may be ultimately obtained. For ease of description, the region labeling frames A2 and B2 are described as the second region labeling frames A2 and B2.

For instance, based on the description of the expansion processing performed on the first region labeling frames in the second direction in FIG. 3A to FIG. 5B, description of expansion processing performed on the first region labeling frames in the first direction is provided as follows.

In some embodiments, step S50 further includes steps S5301 to S5306 to achieve expansion of the first region labeling frames in the first direction.

In step S5301, a $k^{th}$ first region labeling frame among the first region labeling frames is obtained. Herein, the $k^{th}$ first region labeling frame and the $i^{th}$ first region labeling frame are adjacent to each other in the second direction, k is a positive integer that is less than or equal to the number of the first region labeling frames, and i, j, and k are different from one another. For instance, the first region labeling frame C1 provided in the foregoing embodiments may be the $k^{th}$ first region labeling frame.

In step S5302, a coordinate interval formed by coordinate values of two vertexes of the third side or the fourth side of the $i^{th}$ first region labeling frame on the first coordinate axis of the second coordinate system is obtained to act as a fourth coordinate interval, and a coordinate interval formed by coordinate values of two vertexes of the third side or the fourth side of the $k^{th}$ first region labeling frame on the first coordinate axis of the second coordinate system is obtained to act as a fifth coordinate interval. A union of the fourth coordinate interval and the fifth coordinate interval are taken to obtain a sixth coordinate interval. Herein, the sixth coordinate interval includes a third end point value and a fourth end point value. Compared to a coordinate value of the second side of the $i^{th}$ first region labeling frame on the first coordinate axis of the second coordinate system, a coordinate value of the first side of the $i^{th}$ first region labeling frame on the first coordinate axis of the second coordinate system is closer to the third end point value. Compared to a coordinate value of the second side of the $k^{th}$ first region labeling frame on the first coordinate axis of the second coordinate system, a coordinate value of the first side of the $k^{th}$ first region labeling frame on the first coordinate axis of the second coordinate system is closer to the third end point value.

In step S5303, when one side close to the first side of the $i^{th}$ first region labeling frame is not provided with a first region labeling frame adjacent to the $i^{th}$ first region labeling frame in the first direction or when an intersection of a coordinate interval formed by coordinate values of two vertexes of the third side or the fourth side of the first region labeling frame adjacent to the $i^{th}$ first region labeling frame in the first direction and located on one side close to the first side of the $i^{th}$ first region labeling frame on the first coordinate axis of the second coordinate system and the sixth coordinate interval is empty, expansion processing is performed on the third side and the fourth side of the $i^{th}$ first region labeling frame in the first direction to determine the first side of the second region labeling frame corresponding to the $i^{th}$ first region labeling frame. Herein, a coordinate value of two vertexes of the first side of the second region labeling frame corresponding to the $i^{th}$ first region labeling frame on the first coordinate axis of the second coordinate system is the third end point value.

In step S5304, when one side close to the second side of the $i^{th}$ first region labeling frame is not provided with a first region labeling frame adjacent to the $i^{th}$ first region labeling frame in the first direction or when an intersection of a coordinate interval formed by coordinate values of two vertexes of the third side or the fourth side of the first region labeling frame adjacent to the $i^{th}$ first region labeling frame in the first direction and located on one side close to the second side of the $i^{th}$ first region labeling frame on the first coordinate axis of the second coordinate system and the sixth coordinate interval is empty, expansion processing is performed on the third side and the fourth side of the $i^{th}$ first region labeling frame in the first direction to determine the second side of the second region labeling frame corresponding to the $i^{th}$ first region labeling frame. Herein, a coordinate value of two vertexes of the second side of the second region labeling frame corresponding to the $i^{th}$ first region labeling frame on the first coordinate axis of the second coordinate system is the fourth end point value.

In step S5305, when one side close to the first side of the $k^{th}$ first region labeling frame is not provided with a first region labeling frame adjacent to the $k^{th}$ first region labeling frame in the first direction or when an intersection of a coordinate interval formed by coordinate values of two vertexes of the third side or the fourth side of the first region labeling frame adjacent to the $k^{th}$ first region labeling frame in the first direction and located on one side close to the first side of the $k^{th}$ first region labeling frame on the first coordinate axis of the second coordinate system and the sixth coordinate interval is empty, expansion processing is performed on the third side and the fourth side of the $k^{th}$ first region labeling frame in the first direction to determine the first side of the second region labeling frame corresponding to the $k^{th}$ first region labeling frame. Herein, a coordinate value of two vertexes of the first side of the second region labeling frame corresponding to the $k^{th}$ first region labeling frame on the first coordinate axis of the second coordinate system is the third end point value.

In step S5306, when one side close to the second side of the $k^{th}$ first region labeling frame is not provided with a first region labeling frame adjacent to the $k^{th}$ first region labeling frame in the first direction or when an intersection of a coordinate interval formed by coordinate values of two vertexes of the third side or the fourth side of the first region labeling frame adjacent to the $k^{th}$ first region labeling frame in the first direction and located on one side close to the second side of the $k^{th}$ first region labeling frame on the first coordinate axis of the second coordinate system and the sixth coordinate interval is empty, expansion processing is performed on the third side and the fourth side of the $k^{th}$ first region labeling frame in the first direction to determine the second side of the second region labeling frame corresponding to the $k^{th}$ first region labeling frame. Herein, a coordinate value of two vertexes of the second side of the second region labeling frame corresponding to the $k^{th}$ first region labeling frame on the first coordinate axis of the second coordinate system is the fourth end point value.

In some other embodiments, step S50 may further include the following steps S5307 to S5310.

In step S5307, when an intersection of the coordinate interval formed by the coordinate values of the two vertexes of the third side or the fourth side of the first region labeling frame adjacent to the $i^{th}$ first region labeling frame in the first direction and located on one side close to the first side of the $i^{th}$ first region labeling frame on the first coordinate axis of the second coordinate system and the sixth coordinate interval is provided and the intersection is not empty, expansion processing is performed on the third side and the fourth side of the $i^{th}$ first region labeling frame in the first direction to determine the first side of the second region labeling frame corresponding to the $i^{th}$ first region labeling frame. Herein, the first side of the second region labeling frame corresponding to the $i^{th}$ first region labeling frame is adjacent to and directly contacts the second side of the first region labeling frame adjacent to the $i^{th}$ first region labeling frame in the first direction and located on one side close to the first side of the $i^{th}$ first region labeling frame.

In step S5308, when an intersection of the coordinate interval formed by the coordinate values of the two vertexes of the third side or the fourth side of the first region labeling frame adjacent to the $i^{th}$ first region labeling frame in the first direction and located on one side close to the second side of the $i^{th}$ first region labeling frame on the first coordinate axis of the second coordinate system and the sixth coordinate interval is provided and the intersection is not empty, expansion processing is performed on the third side and the fourth side of the $i^{th}$ first region labeling frame in the first direction to determine the second side of the second region labeling frame corresponding to the $i^{th}$ first region labeling frame. Herein, the second side of the second region labeling frame corresponding to the $i^{th}$ first region labeling frame is adjacent to and directly contacts the first side of the first region labeling frame adjacent to the $i^{th}$ first region labeling frame in the first direction and located on one side close to the second side of the $i^{th}$ first region labeling frame.

In step S5309, when an intersection of the coordinate interval formed by the coordinate values of the two vertexes of the third side or the fourth side of the first region labeling frame adjacent to the $k^{th}$ first region labeling frame in the first direction and located on one side close to the first side of the $k^{th}$ first region labeling frame on the first coordinate axis of the second coordinate system and the sixth coordinate interval is provided and the intersection is not empty, expansion processing is performed on the third side and the fourth side of the $k^{th}$ first region labeling frame in the first direction to determine the first side of the second region labeling frame corresponding to the $k^{th}$ first region labeling frame. Herein, the first side of the second region labeling frame corresponding to the $k^{th}$ first region labeling frame is adjacent to and directly contacts the second side of the first region labeling frame adjacent to the $k^{th}$ first region labeling frame in the first direction and located on one side close to the first side of the $k^{th}$ first region labeling frame.

In step S5310, when an intersection of the coordinate interval formed by the coordinate values of the two vertexes of the third side or the fourth side of the first region labeling frame adjacent to the $k^{th}$ first region labeling frame in the first direction and located on one side close to the second side of the $k^{th}$ first region labeling frame on the first coordinate axis of the second coordinate system and the sixth coordinate interval is provided and the intersection is not empty, expansion processing is performed on the third side and the fourth side of the $k^{th}$ first region labeling frame in the first direction to determine the second side of the second region labeling frame corresponding to the $k^{th}$ first region labeling frame. Herein, the second side of the second region labeling frame corresponding to the $k^{th}$ first region labeling frame is adjacent to and directly contacts the first side of the first region labeling frame adjacent to the $k^{th}$ first region labeling frame in the first direction and located on one side close to the second side of the $k^{th}$ first region labeling frame.

Note that in the foregoing examples, the expansion processing performed on the third side A13 and the fourth side A14 of the first region labeling frame A1 in the first direction R1 and the expansion processing performed on the third side B13 and the fourth side B14 of the first region labeling frame B1 in the first direction R1 in steps S5301 to S5310 are basically similar or identical to the expansion processing performed on the first side A11 and the second side A12 of the first region labeling frame A1 in the second direction R2 and the expansion processing performed on the first side B11 and the second side B12 of the first region labeling frame B1 in the second direction R2 in the foregoing examples. Specific content of steps S5301 to S5310 may be found with reference to the description corresponding to the examples shown in FIG. 3A to FIG. 3D, FIG. 4A to FIG. 4D, and FIG. 5A to FIG. 5B in the foregoing paragraphs, and repeated description is not provided herein.

In some embodiments of the disclosure, the input image further includes a plurality of table lines extending in the first direction and the second direction and arranged in an alternating manner to divide the object regions, and the table lines are located in the first coordinate system. In the image processing method provided by the embodiments of the disclosure, the table lines in the input image are identified. The table lines are mapped from the first coordinate system to the second coordinate system according to the reference value to obtain a plurality of reference lines mapped to the table lines one-to-one.

For instance, in some embodiments, the table lines in the input image may be identified based on an edge detection algorithm.

For instance, in the case that the input image further includes plural table lines, step S50 further includes steps S551 to S554.

In step S551, first coordinates of vertexes of the object region labeling frames in the first coordinate system are obtained.

In step S552, the first coordinates of the vertexes of the object region labeling frames are mapped to the second coordinate system based on the reference value to obtain second coordinates of the vertexes of the object region labeling frames in the second coordinate system.

In step S553, according to the second coordinates of the vertexes of the object region labeling frames in the second coordinate system, a plurality of middle region labeling frames corresponding to the object region labeling frames one-to-one are determined. Herein, coordinates of vertexes of the middle region labeling frames in the second coordinate system are the second coordinates of the vertexes of the corresponding object region labeling frames in the second coordinate system.

In step S554, based on adjustment made by the table lines on the middle region labeling frames, the first region labeling frames are obtained. Herein, each first region labeling frame among the first region labeling frames and the reference lines do not overlap in a region defined in the second coordinate system.

In some embodiments of the disclosure, in step S554, regarding any middle region labeling frame among the middle region labeling frames, when the any middle region labeling frame overlaps any reference line among the reference lines, one side of the any middle region labeling frame closest to the any reference line but does not overlap the any reference line is adjusted to determine a corresponding side of the first region labeling frame corresponding to the any middle region labeling frame. Herein, the corresponding side of the first region labeling frame corresponding to the any middle region labeling frame overlaps the any reference line.

Figure 6A:
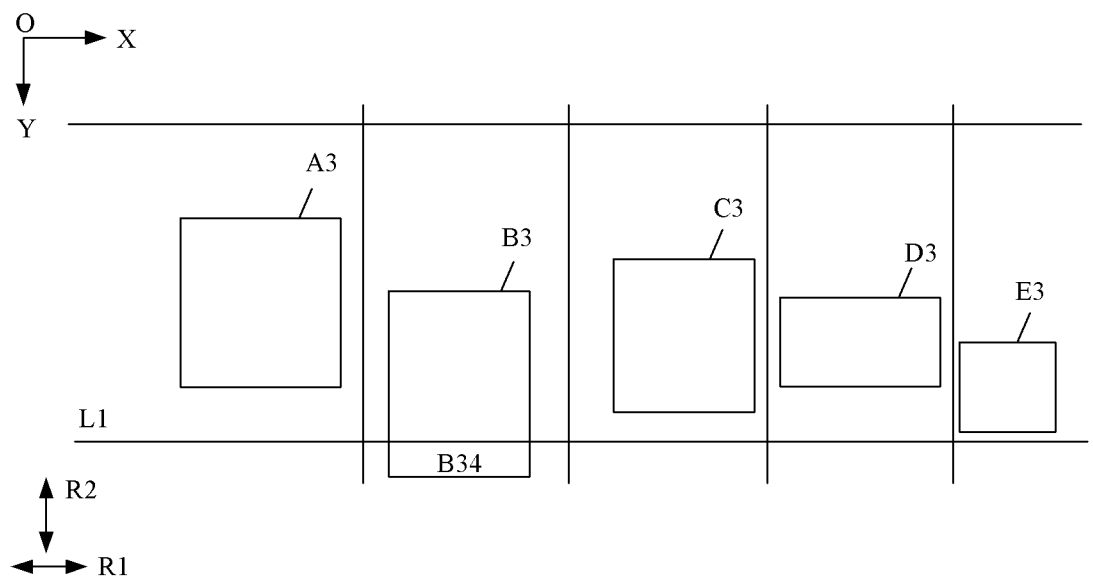
FIG. 6A is a schematic diagram of a plurality of middle region labeling frames according to at least one embodiment of the disclosure.
Figure 6B:
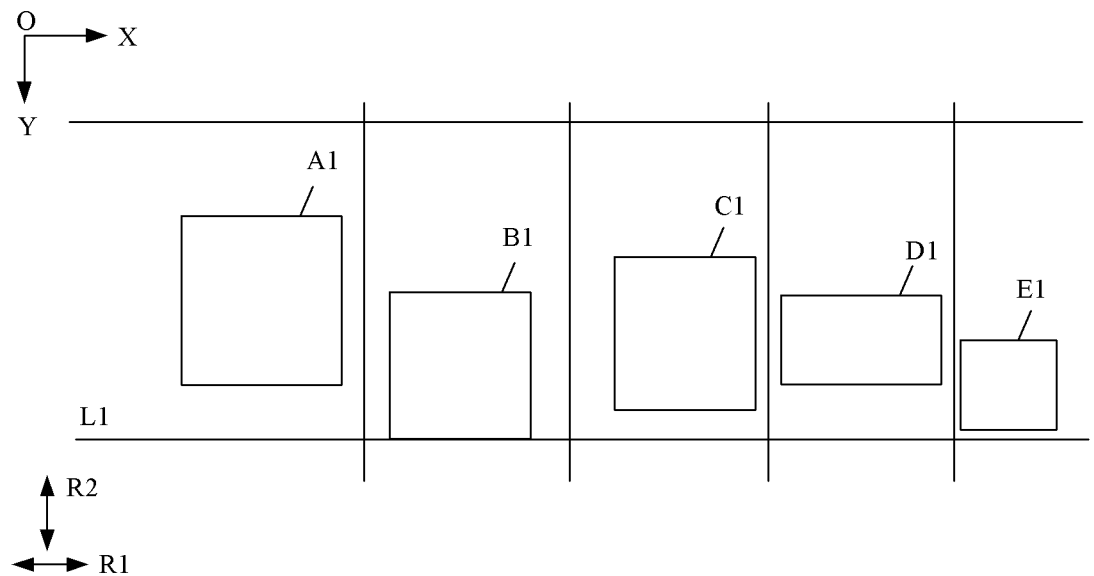
FIG. 6B is a schematic diagram of the first region labeling frames which are obtained after the middle region labeling frames shown in FIG. 6A are adjusted.
Figure 6C:
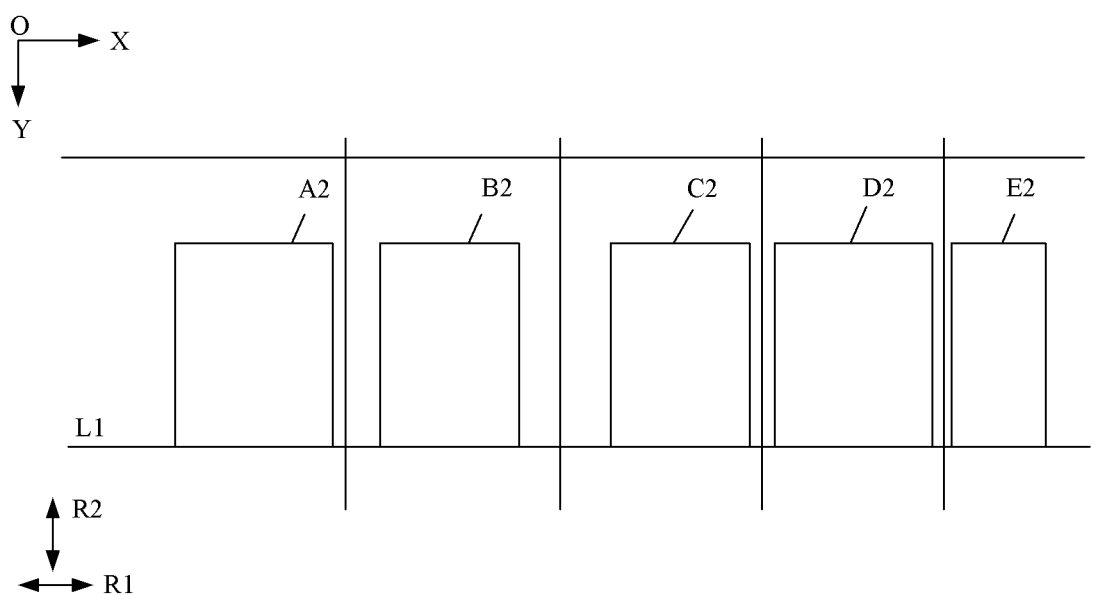
FIG. 6C is a schematic diagram of the corresponding second region labeling frames which are obtained after expansion processing is performed on the first region labeling frames as shown in FIG. 6B.

FIG. 6A is a schematic diagram of a plurality of middle region labeling frames according to at least one embodiment of the disclosure. FIG. 6B is a schematic diagram of the first region labeling frames which are obtained after the middle region labeling frames shown in FIG. 6A are adjusted. FIG. 6C is a schematic diagram of the corresponding second region labeling frames which are obtained after expansion processing is performed on the first region labeling frames as shown in FIG. 6B.

For instance, besides the reference line corresponding to the table lines, the arrangement, shapes, sizes, etc. of the middle region labeling frames shown in FIG. 6A (as well as the first region labeling frames shown in FIG. 6B) and the first region labeling frames shown in FIG. 2A are basically the same or similar. The specific method of performing expansion processing on the first region labeling frames in FIG. 6B to obtain the second region labeling frames in FIG. 6C may be found with reference to the content related to the expansion processing performed on the first region labeling frames to obtain the second region labeling frames shown in the examples of FIG. 2A to FIG. 2D, and description thereof is thus not repeated herein.

With reference to FIG. 6A to FIG. 6C together, when a plurality of middle region labeling frames A3, B3, C3, D3, and E3 shown in FIG. 6A are adjusted to obtain the plural first region labeling frames A1, B1, C1, D1, and E1 shown in FIG. 6B, in step S554, regarding any middle region labeling frame (e.g., the middle region labeling frame B3) among the middle region labeling frames A3, B3, C3, D3, and E3, when the any middle region labeling frame overlaps any reference line (e.g., a reference line L1), one side (e.g., a fourth side B34 of the middle region labeling frame B3 in the example shown in FIG. 6A) of the any middle region labeling frame closest to the any reference line but does not overlap the any reference line is adjusted to determine the corresponding side of the first region labeling frame corresponding to the any middle region labeling frame. For instance, in the examples shown in FIG. 6A to FIG. 6C, the corresponding side of the first region labeling frame corresponding to the any middle region labeling frame overlaps the reference line L1, and that the plural second region labeling frames A2, B2, C2, D2, and E2 shown in FIG. 6C are obtained. In this way, the corresponding table region labeling frames which are subsequently determined based on the second region labeling frames are accurately provided, and that the generated table may exhibit improved accuracy and precision.

Note that in the foregoing embodiments, step S554 is executed before expansion processing is performed on the first region labeling frames A1, B1, C1, D1, and E1, but in some other embodiments of the disclosure, step S554 may be executed after expansion processing is performed on the first region labeling frames A1, B1, C1, D1, and E1. That is, the order of execution of step S554 is not limited in the embodiments of the disclosure. For instance, adjustment of the sides of the first region labeling frames based on the reference lines may be performed before expansion processing is performed on the first region labeling frames but may also be performed after expansion processing is performed on the first region labeling frames.

Figure 7:
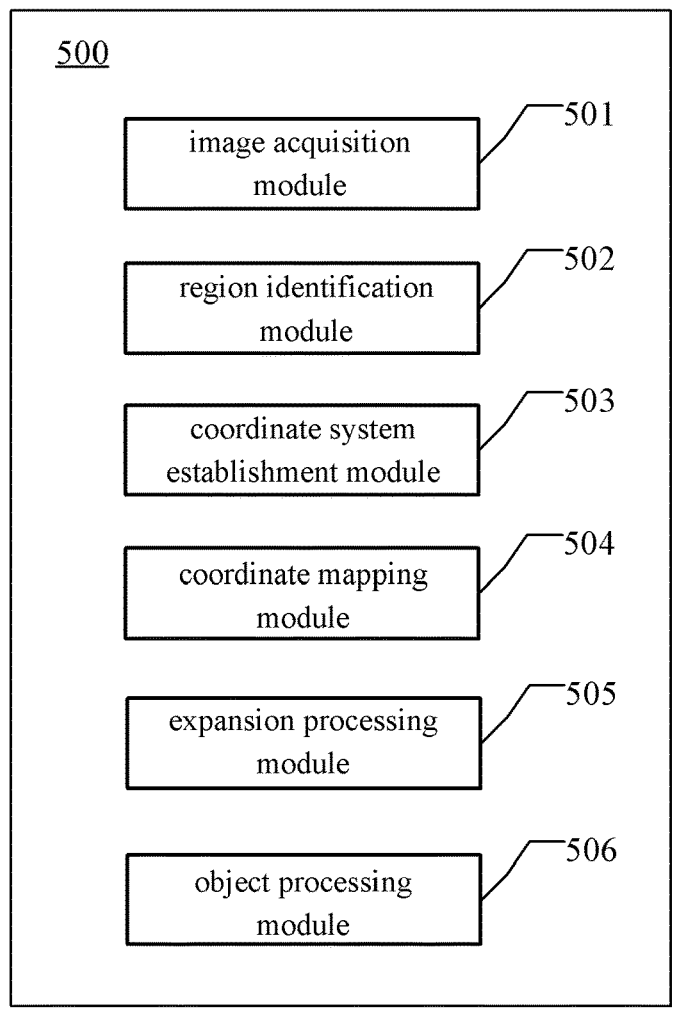
FIG. 7 is a schematic block view of an image processing device according to at least one embodiment of the disclosure.

An image processing device is provided in at least one embodiment of the disclosure, and FIG. 7 is a schematic block view of an image processing device according to at least one embodiment of the disclosure.

As shown in FIG. 7, an image processing device 500 may include an image acquisition module 501, a region identification module 502, a coordinate system establishment module 503, a coordinate mapping module 504, and an expansion processing module 505.

For instance, in some embodiments, the image processing device 500 may further include an object processing module 506. The object processing module 506 is configured to identify the at least one object included in each object region among the object regions and fill the at least one object included in each object region among the object regions into the corresponding table region labeling frame to generate a table.

For instance, each of the image acquisition module 501, the region identification module 502, the coordinate system establishment module 503, the coordinate mapping module 504, the expansion processing module 505, and the object processing module 506 may include a code and a program stored in a storage. A processor may execute the code and the program to implement some functions or all functions provided by each of the abovementioned image acquisition module 501, the region identification module 502, the coordinate system establishment module 503, the coordinate mapping module 504, the expansion processing module 505, and the object processing module 506. For instance, the image acquisition module 501, the region identification module 502, the coordinate system establishment module 503, the coordinate mapping module 504, the expansion processing module 505, and the object processing module

506 may be dedicated hardware devices configured to implement some functions or all functions of the abovementioned image acquisition module 501, the region identification module 502, the coordinate system establishment module 503, the coordinate mapping module 504, the expansion processing module 505, and the object processing module 506. For instance, each of the image acquisition module 501, the region identification module 502, the coordinate system establishment module 503, the coordinate mapping module 504, the expansion processing module 505, and the object processing module 506 be a circuit board or a combination of multiple circuit boards configured to implement the functions described above. In the embodiments of the disclosure, the one circuit board or the combination of multiple circuit boards may include (1) one or a plurality of processors, (2) one or a plurality of non-transitory memories connected to the processor, and (3) firmware stored in the storage executable by the processor.

Note that the image acquisition module 501 is configured to implement step S10 shown in FIG. 1A, the region identification module 502 is configured to implement step S20 shown in FIG. 1A, the coordinate system establishment module 503 is configured to implement step S30 shown in FIG. 1A, the coordinate mapping module 504 is configured to implement steps S40 and S60 shown in FIG. 1A, and the expansion processing module 505 is configured to implement step S50 shown in FIG. 1A, For instance, the object processing module 506 is configured to implement step S70 in the embodiments of the image processing method. Specific description of the functions provided by the image acquisition module 501, the region identification module 502, the coordinate system establishment module 503, the coordinate mapping module 504, the expansion processing module 505, and the object processing module 506 may be found with reference to the description related to steps S10 to S70 in the embodiments of the image processing method, and thus is not repeated herein. In addition, the image processing device may achieve technical effects similar to that provided by the image processing method, and description thereof is not repeated herein.

Figure 8:
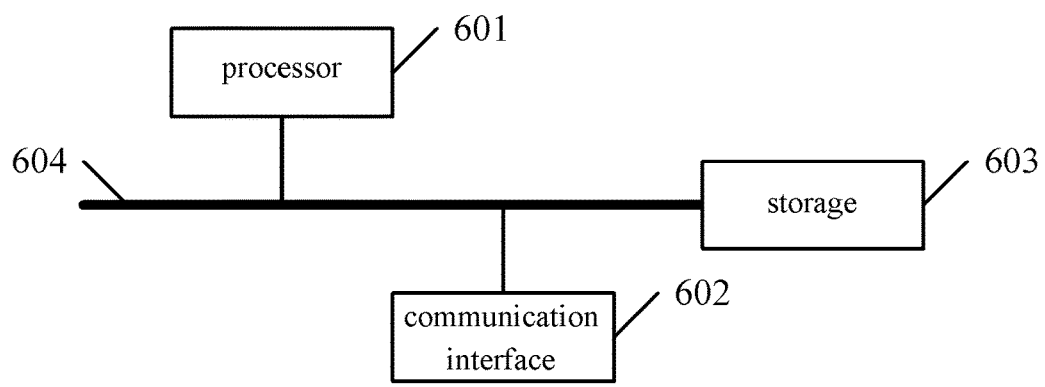
FIG. 8 is a schematic view of an electronic apparatus according to at least one embodiment of the disclosure.

An electronic apparatus is provided in at least one embodiment of the disclosure, and FIG. 8 is a schematic view of an electronic apparatus according to at least one embodiment of the disclosure.

For instance, as shown in FIG. 8, an electronic apparatus includes a processor 601, a communication interface 602, a storage 603, and a communication bus 604. The processor 601, the communication interface 602, and the storage 603 may communicate with one another through the communication bus 604, and the processor 601, the communication interface 602, the storage 603, and other components may also communicate with one another through network connection. Herein, the types and functions of the network are not limited in the disclosure. Note that the components of the electronic apparatus shown in FIG. 8 are only exemplary and are not restrictive, and the electronic apparatus may also include other components according to actual application needs.

For instance, the storage 603 is configured for non-transitory storage of computer-readable instructions. The processor 601 is configured to implement the image processing method according to any of the foregoing embodiments when executing computer-readable instructions. Specific implementation and related descriptive content of the steps of the image processing method may be found with reference to the embodiments of the image processing method, and description thereof is thus not provided herein.

For instance, other implementation of the image processing method implemented through executing computer-readable instructions stored in the storage 603 by the processor 601 is identical to the implementation mentioned in the foregoing method embodiments, and description thereof is thus not repeated herein.

For instance, the communication bus 604 may be a Peripheral Component Interconnection (PCI) bus or an Extended Industry Standard Architecture (EISA) bus or the like. The communication bus may be divided into address bus, data bus, control bus and so on. For ease of illustration, the figure is represented by only one thick line, but it does not mean that there is only one bus or one type of bus.

For instance, the communication interface 602 is configured to implement communication between the electronic apparatus and other apparatuses.

For instance, the processor 601 and the storage 603 may be provided on the server side (or the cloud side).

For instance, the processor 601 may control other components in the electronic apparatus to perform desired functions. The processor 601 may be a central processing unit (CPU), a network processing unit (NP), a tensor processor (TPU), or a graphics processing unit (GPU), and other devices with data processing capabilities and/or program execution capabilities, and the processor 601 may also be a digital signal processor (DSP), an application specific integrated circuit (ASIC), a field programmable gate array (FPGA) or other programmable logic devices, discrete gates, transistor logic devices, or discrete hardware components. The central processing unit (CPU) may be X86 or ARM architecture, etc.

For instance, the storage 603 may include any combination of one or more computer program products, and the computer program product may include various forms of computer-readable storage media, such as volatile memory and/or non-volatile memory. The volatile memory may include random access memory (RAM) and/or cache memory (cache), for example. The non-volatile memory may include, for example, read only memory (ROM), hard disk, erasable programmable read only memory (EPROM), portable compact disk read only memory (CD-ROM), USB memory, flash memory, etc. One or more computer-readable instructions may be stored on the computer-readable storage medium, and the processor 601 may run the computer-readable instructions to implement various functions of the electronic apparatus. Various application programs and various data may also be stored in the storage medium.

For instance, in some embodiments, the electronic apparatus may further include an image acquisition component. The image acquisition component is configured to acquire the input image of an object. The storage 603 is further configured to store the input image.

For instance, the image acquisition component may be a camera of a smart phone, a camera of a tablet computer, a camera of a personal computer, a lens of a digital camera, or a webcam.

For instance, the input image may be an original image directly collected by the image acquisition component or an image which is obtained after the original image is processed. Preprocessing may eliminate irrelevant information or noise information in the original image, so as to better process the input image. The preprocessing may include, for example, image expansion (data augment), image scaling, gamma correction, image enhancement, or noise reduction filtering on the original image.

For instance, detailed description of image processing executed by the electronic apparatus may be found with reference to the related description in the embodiments of the image processing method and thus is not repeated herein.

Figure 9:
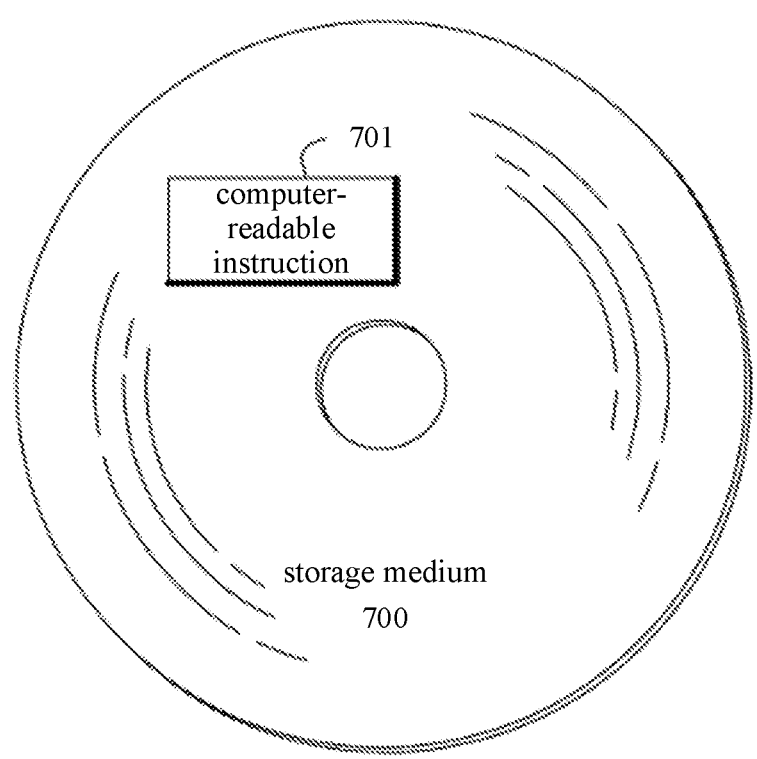
FIG. 9 is a schematic view of a non-transitory computer-readable storage medium according to at least one embodiment of the disclosure.

FIG. 9 is a schematic view of a non-transitory computer-readable storage medium according to at least one embodiment of the disclosure. For instance, as shown in FIG. 9, one or more computer-readable instructions 701 may be non-transitory stored on a storage medium 700. For instance, when the computer-readable instruction 701 is executed by a processor, one or more steps in the image processing method described above may be executed.

For instance, the storage medium 700 may be applied in the electronic apparatus, for example, the storage medium 700 may include the storage 603 in the electronic apparatus.

For instance, description of the storage medium 700 may be found with reference to the description of the storage in the embodiments regarding the electronic apparatus and thus is not repeated herein.

Regarding the disclosure, the following is required to be explained.

(1) The accompanying drawings of the embodiments of the disclosure only refer to the structures related to the embodiments of the disclosure, and general design may be referenced for other structures.

(2) For clarity, in the accompanying drawings used to describe the embodiments of the disclosure, the thickness and size of layers or structures are exaggerated. It should be understood that when an element such as a layer, film, region, or substrate is referred to as being "on" or "under" another element, the element may be "directly" "on" or "under" the another element, or intervening elements may be presented therebetween.

(3) The embodiments of the disclosure and the features in the embodiments may be combined with each other to obtain new embodiments with absence of conflict.

The above are only specific implementation of the disclosure, but the protection scope of the disclosure is not limited thereto. The protection scope of the disclosure should be subject to the protection scope of the claims.

What is claimed is:

1. An image processing method, adapted to an image processing device, the image processing method comprising:
    obtaining an input image, wherein the input image comprises a plurality of object regions, and each object region of the plurality of object regions comprises at least one object;
    identifying the object regions in the input image to obtain a plurality of object region labeling frames corresponding to the object regions one-to-one;
    establishing a first coordinate system based on the input image, wherein the object region labeling frames are located in the first coordinate system;
    mapping the object region labeling frames from the first coordinate system to a second coordinate system according to a reference value to obtain a plurality of first region labeling frames corresponding to the object region labeling frames one-to-one, wherein the first region labeling frames are located in the second coordinate system;
    performing expansion processing on the first region labeling frames to obtain a plurality of expanded second region labeling frames, wherein the first region labeling frames correspond to the second region labeling frames one-to-one;
    mapping the second region labeling frames from the second coordinate system to the first coordinate system according to the reference value to obtain a plurality of table region labeling frames corresponding to the object regions one-to-one; and
    identifying objects included in the object regions and filling the objects included in the object regions into the table region labeling frames to generate a table.

2. The image processing method according to claim 1, wherein at least one object in each object region is arranged in a row in a first direction,
    wherein a first coordinate axis of the first coordinate system and a first coordinate axis of the second coordinate system are parallel to the first direction, and a second coordinate axis of the first coordinate system and a second coordinate axis of the second coordinate system are parallel to a second direction perpendicular to the first direction,
    wherein the first region labeling frames are arranged in a row in the first direction or the second direction, and each of the first region labeling frames and the second region labeling frames comprises a first side and a second side opposite to each other in the first direction and a third side and a fourth side opposite to each other in the second direction,
    wherein the step of performing expansion processing on the first region labeling frames to obtain the expanded second region labeling frames further comprises:
    obtaining an $i^{th}$ first region labeling frame and a $j^{th}$ first region labeling frame adjacent to each other among the first region labeling frames, wherein i and j are positive integers that are less than or equal to a number of the first region labeling frames, and i and j are different from each other;
    in response to the first region labeling frames being arranged in a row in the first direction:
    obtaining a coordinate interval formed by coordinate values of two vertexes of the first side or the second side of the $i^{th}$ first region labeling frame on the second coordinate axis of the second coordinate system to act as a first coordinate interval and a coordinate interval formed by coordinate values of two vertexes of the first side or the second side of the $j^{th}$ first region labeling frame on the second coordinate axis of the second coordinate system to act as a second coordinate interval, and getting an union of the first coordinate interval and the second coordinate interval to obtain a third coordinate interval;
    performing expansion processing on the first side and the second side of the $i^{th}$ first region labeling frame in the second direction to obtain the second region labeling frame corresponding to the $i^{th}$ first region labeling frame, wherein each of coordinate intervals formed by coordinate values of two vertexes of the first side and two vertexes of the second side of the second region labeling frame corresponding to the $i^{th}$ first region labeling frame on the second coordinate axis of the second coordinate system is the third coordinate interval; and
    performing expansion processing on the first side and the second side of the $j^{th}$ first region labeling frame in the second direction to obtain the second region labeling frame corresponding to the $j^{th}$ first region labeling frame, wherein each of coordinate intervals formed by coordinate values of two vertexes of the first side and two vertexes of the second side of the second region labeling frame corresponding to the $i^{th}$ first region labeling frame on the second coordinate axis of the second coordinate system is the third coordinate interval;

in response to the first region labeling frames being arranged in a row in the second direction:

obtaining a coordinate interval formed by coordinate values of two vertexes of the third side or the fourth side of the $i^{th}$ first region labeling frame on the first coordinate axis of the second coordinate system to act as a first coordinate interval and a coordinate interval formed by coordinate values of two vertexes of the third side or the fourth side of the $j^{th}$ first region labeling frame on the first coordinate axis of the second coordinate system to act as a second coordinate interval, and getting an union of the first coordinate interval and the second coordinate interval to obtain a third coordinate interval;

performing expansion processing on the third side and the fourth side of the $i^{th}$ first region labeling frame in the first direction to obtain the second region labeling frame corresponding to the $i^{th}$ first region labeling frame, wherein each of coordinate intervals formed by coordinate values of two vertexes of the third side and two vertexes of the fourth side of the second region labeling frame corresponding to the $i^{th}$ first region labeling frame on the first coordinate axis of the second coordinate system is the third coordinate interval; and performing expansion processing on the third side and the fourth side of the $j^{th}$ first region labeling frame in the first direction to obtain the second region labeling frame corresponding to the $j^{th}$ first region labeling frame, wherein each of coordinate intervals formed by coordinate values of two vertexes of the third side and two vertexes of the fourth side of the second region labeling frame corresponding to the $j^{th}$ first region labeling frame on the first coordinate axis of the second coordinate system is the third coordinate interval.

3. The image processing method according to claim 1, wherein the at least one object in each object region is arranged in a row in a first direction, wherein a first coordinate axis of the first coordinate system and a first coordinate axis of the second coordinate system are parallel to the first direction, and a second coordinate axis of the first coordinate system and a second coordinate axis of the second coordinate system are parallel to a second direction perpendicular to the first direction, wherein the first region labeling frames are arranged in a plurality of rows and a plurality of columns in the first direction and the second direction, wherein each of the first region labeling frames and the second region labeling frames comprises a first side and a second side opposite to each other in the first direction and a third side and a fourth side opposite to each other in the second direction, wherein the step of performing expansion processing on the first region labeling frames to obtain the expanded second region labeling frames further comprises:

obtaining an $i^{th}$ first region labeling frame and a $j^{th}$ first region labeling frame adjacent to each other in the first direction among the first region labeling frames, wherein i and j are positive integers that are less than or equal to a number of the first region labeling frames, and i and j are different from each other;

obtaining a coordinate interval formed by coordinate values of two vertexes of the first side or the second side of the $i^{th}$ first region labeling frame on the second coordinate axis of the second coordinate system to act as a first coordinate interval and a coordinate interval formed by coordinate values of two vertexes of the first side or the second side of the $j^{th}$ first region labeling frame on the second coordinate axis of the second coordinate system to act as a second coordinate interval, and getting an union of the first coordinate interval and the second coordinate interval to obtain a third coordinate interval, wherein the third coordinate interval comprises a first end point value and a second end point value, a coordinate value of the third side of the $i^{th}$ first region labeling frame on the second coordinate axis of the second coordinate system is closer to the first end point value compared to a coordinate value of the fourth side of the $i^{th}$ first region labeling frame on the second coordinate axis of the second coordinate system, and a coordinate value of the third side of the $j^{th}$ first region labeling frame on the second coordinate axis of the second coordinate system is closer to the first end point value compared to a coordinate value of the fourth side of the $j^{th}$ first region labeling frame on the second coordinate axis of the second coordinate system;

performing expansion processing on the first side and the second side of the $i^{th}$ first region labeling frame in the second direction to determine the third side of the second region labeling frame corresponding to the $i^{th}$ first region labeling frame when one side close to the third side of the $i^{th}$ first region labeling frame is not provided with a first region labeling frame adjacent to the $i^{th}$ first region labeling frame in the second direction or when an intersection of a coordinate interval formed by coordinate values of two vertexes of the first side or the second side of the first region labeling frame adjacent to the $i^{th}$ first region labeling frame in the second direction and located on one side close to the third side of the $i^{th}$ first region labeling frame on the second coordinate axis of the second coordinate system and the third coordinate interval is empty, wherein a coordinate value of two vertexes of the third side of the second region labeling frame corresponding to the $i^{th}$ first region labeling frame on the second coordinate axis of the second coordinate system is the first end point value;

performing expansion processing on the first side and the second side of the $i^{th}$ first region labeling frame in the second direction to determine the fourth side of the second region labeling frame corresponding to the $i^{th}$ first region labeling frame when one side close to the fourth side of the $i^{th}$ first region labeling frame is not provided with a first region labeling frame adjacent to the $i^{th}$ first region labeling frame in the second direction or when an intersection of a coordinate interval formed by coordinate values of two vertexes of the first side or the second side of the first region labeling frame adjacent to the $i^{th}$ first region labeling frame in the second direction and located on one side close to the fourth side of the $i^{th}$ first region labeling frame on the second coordinate axis of the second coordinate system and the third coordinate interval is empty, wherein a coordinate value of two vertexes of the fourth side of the second region labeling frame corresponding to the $i^{th}$ first region labeling frame on the second coordinate axis of the second coordinate system is the second end point value;

performing expansion processing on the first side and the second side of the $j^{th}$ first region labeling frame in the second direction to determine the third side of the second region labeling frame corresponding to the $j^{th}$ first region labeling frame when one side close to the third side of the $j^{th}$ first region labeling frame is not provided with a first region labeling frame adjacent to the $j^{th}$ first region labeling frame in the second direction or when an intersection of a coordinate interval formed by coordinate values of two vertexes of the first side or the second side of the first region labeling frame adjacent to the $j^{th}$ first region labeling frame in the second direction and located on one side close to the third side of the $j^{th}$ first region labeling frame on the second coordinate axis of the second coordinate system and the third coordinate interval is empty, wherein a coordinate value of two vertexes of the third side of the second region labeling frame corresponding to the $j^{th}$ first region labeling frame on the second coordinate axis of the second coordinate system is the first end point value; and performing expansion processing on the first side and the second side of the $j^{th}$ first region labeling frame in the second direction to determine the fourth side of the second region labeling frame corresponding to the $j^{th}$ first region labeling frame when one side close to the fourth side of the $j^{th}$ first region labeling frame is not provided with a first region labeling frame adjacent to the $j^{th}$ first region labeling frame in the second direction or when an intersection of a coordinate interval formed by coordinate values of two vertexes of the first side or the second side of the first region labeling frame adjacent to the $j^{th}$ first region labeling frame in the second direction and located on one side close to the fourth side of the $j^{th}$ first region labeling frame on the second coordinate axis of the second coordinate system and the third coordinate interval is empty, wherein a coordinate value of two vertexes of the fourth side of the second region labeling frame corresponding to the $j^{th}$ first region labeling frame on the second coordinate axis of the second coordinate system is the second end point value.

4. The image processing method according to claim 3, wherein the step of performing expansion processing on the first region labeling frames to obtain the expanded second region labeling frames further comprises:

performing expansion processing on the first side and second side of the $i^{th}$ first region labeling frame in the second direction to determine the third side of the second region labeling frame corresponding to the $i^{th}$ first region labeling frame when an intersection of the coordinate interval formed by the coordinate values of the two vertexes of the first side or the second side of the first region labeling frame adjacent to the $i^{th}$ first region labeling frame in the second direction and located on one side close to the third side of the $i^{th}$ first region labeling frame on the second coordinate axis of the second coordinate system and the third coordinate interval is provided and the intersection is not empty, wherein the third side of the second region labeling frame corresponding to the $i^{th}$ first region labeling frame is adjacent to and directly contacts the fourth side of the first region labeling frame adjacent to the $i^{th}$ first region labeling frame in the second direction and located on one side close to the third side of the $i^{th}$ first region labeling frame;

performing expansion processing on the first side and the second side of the $i^{th}$ first region labeling frame in the second direction to determine the fourth side of the second region labeling frame corresponding to the $i^{th}$ first region labeling frame when an intersection of the coordinate interval formed by the coordinate values of the two vertexes of the first side or the second side of the first region labeling frame adjacent to the $i^{th}$ first region labeling frame in the second direction and located on one side close to the fourth side of the $i^{th}$ first region labeling frame on the second coordinate axis of the second coordinate system and the third coordinate interval is provided and the intersection is not empty, wherein the fourth side of the second region labeling frame corresponding to the $i^{th}$ first region labeling frame is adjacent to and directly contacts the third side of the first region labeling frame adjacent to the $i^{th}$ first region labeling frame in the second direction and located on one side close to the fourth side of the $i^{th}$ first region labeling frame;

performing expansion processing on the first side and the second side of the $j^{th}$ first region labeling frame in the second direction to determine the third side of the second region labeling frame corresponding to the $j^{th}$ first region labeling frame when an intersection of the coordinate interval formed by the coordinate values of the two vertexes of the first side or the second side of the first region labeling frame adjacent to the $j^{th}$ first region labeling frame in the second direction and located on one side close to the third side of the $j^{th}$ first region labeling frame on the second coordinate axis of the second coordinate system and the third coordinate interval is provided and the intersection is not empty, wherein the third side of the second region labeling frame corresponding to the $j^{th}$ first region labeling frame is adjacent to and directly contacts the fourth side of the first region labeling frame adjacent to the $j^{th}$ first region labeling frame in the second direction and located on one side close to the third side of the $j^{th}$ first region labeling frame; and performing expansion processing on the first side and the second side of the $j^{th}$ first region labeling frame in the second direction to determine the fourth side of the second region labeling frame corresponding to the $j^{th}$ first region labeling frame when an intersection of the coordinate interval formed by the coordinate values of the two vertexes of the first side or the second side of the first region labeling frame adjacent to the $j^{th}$ first region labeling frame in the second direction and located on one side close to the fourth side of the $j^{th}$ first region labeling frame on the second coordinate axis of the second coordinate system and the third coordinate interval is provided and the intersection is not empty, wherein the fourth side of the second region labeling frame corresponding to the $j^{th}$ first region labeling frame is adjacent to and directly contacts the third side of the first region labeling frame adjacent to the $j^{th}$ first region labeling frame in the second direction and located on one side close to the fourth side of the $j^{th}$ first region labeling frame.

5. The image processing method according to claim 4, wherein the step of performing expansion processing on the first region labeling frames to obtain the expanded second region labeling frames further comprises:

obtaining a $k^{th}$ first region labeling frame among the first region labeling frames, wherein the $k^{th}$ first region labeling frame and the $i^{th}$ first region labeling frame are adjacent to each other in the second direction, wherein k is a positive integer that is less than or equal to the number of the first region labeling frames, and i, j, and k are different from one another;

obtaining a coordinate interval formed by coordinate values of two vertexes of the third side or the fourth side of the $i^{th}$ first region labeling frame on the first coordinate axis of the second coordinate system to act as a fourth coordinate interval and a coordinate interval formed by coordinate values of two vertexes of the third side or the fourth side of the $k^{th}$ first region labeling frame on the first coordinate axis of the second coordinate system to act as a fifth coordinate interval, and getting an union of the fourth coordinate interval and the fifth coordinate interval to obtain a sixth coordinate interval, wherein the sixth coordinate interval comprises a third end point value and a fourth end point value, a coordinate value of the first side of the $i^{th}$ first region labeling frame on the first coordinate axis of the second coordinate system is closer to the third end point value compared to a coordinate value of the second side of the $i^{th}$ first region labeling frame on the first coordinate axis of the second coordinate system, and a coordinate value of the first side of the $k^{th}$ first region labeling frame on the first coordinate axis of the second coordinate system is closer to the third end point value compared to a coordinate value of the second side of the $k^{th}$ first region labeling frame on the first coordinate axis of the second coordinate system;

performing expansion processing on the third side and the fourth side of the $i^{th}$ first region labeling frame in the first direction to determine the first side of the second region labeling frame corresponding to the $i^{th}$ first region labeling frame when one side close to the first side of the $i^{th}$ first region labeling frame is not provided with a first region labeling frame adjacent to the $i^{th}$ first region labeling frame in the first direction or when an intersection of a coordinate interval formed by coordinate values of two vertexes of the third side or the fourth side of the first region labeling frame adjacent to the $i^{th}$ first region labeling frame in the first direction and located on one side close to the first side of the $i^{th}$ first region labeling frame on the first coordinate axis of the second coordinate system and the sixth coordinate interval is empty, wherein a coordinate value of two vertexes of the first side of the second region labeling frame corresponding to the $i^{th}$ first region labeling frame on the first coordinate axis of the second coordinate system is the third end point value;

performing expansion processing on the third side and the fourth side of the $i^{th}$ first region labeling frame in the first direction to determine the second side of the second region labeling frame corresponding to the $i^{th}$ first region labeling frame when one side close to the second side of the $i^{th}$ first region labeling frame is not provided with a first region labeling frame adjacent to the $i^{th}$ first region labeling frame in the first direction or when an intersection of a coordinate interval formed by coordinate values of two vertexes of the third side or the fourth side of the first region labeling frame adjacent to the $i^{th}$ first region labeling frame in the first direction and located on one side close to the second side of the $i^{th}$ first region labeling frame on the first coordinate axis of the second coordinate system and the sixth coordinate interval is empty, wherein a coordinate value of two vertexes of the second side of the second region labeling frame corresponding to the $i^{th}$ first region labeling frame on the first coordinate axis of the second coordinate system is the fourth end point value;

performing expansion processing on the third side and the fourth side of the $k^{th}$ first region labeling frame in the first direction to determine the first side of the second region labeling frame corresponding to the $k^{th}$ first region labeling frame when one side close to the first side of the $k^{th}$ first region labeling frame is not provided with a first region labeling frame adjacent to the $k^{th}$ first region labeling frame in the first direction or when an intersection of a coordinate interval formed by coordinate values of two vertexes of the third side or the fourth side of the first region labeling frame adjacent to the $k^{th}$ first region labeling frame in the first direction and located on one side close to the first side of the $k^{th}$ first region labeling frame on the first coordinate axis of the second coordinate system and the sixth coordinate interval is empty, wherein a coordinate value of two vertexes of the first side of the second region labeling frame corresponding to the $k^{th}$ first region labeling frame on the first coordinate axis of the second coordinate system is the third end point value; and performing expansion processing on the third side and the fourth side of the $k^{th}$ first region labeling frame in the first direction to determine the first side of the second region labeling frame corresponding to the $k^{th}$ first region labeling frame when one side close to the second side of the $k^{th}$ first region labeling frame is not provided with a first region labeling frame adjacent to the $k^{th}$ first region labeling frame in the first direction or when an intersection of a coordinate interval formed by coordinate values of two vertexes of the third side or the fourth side of the first region labeling frame adjacent to the $k^{th}$ first region labeling frame in the first direction and located on one side close to the second side of the $k^{th}$ first region labeling frame on the first coordinate axis of the second coordinate system and the sixth coordinate interval is empty, wherein a coordinate value of two vertexes of the second side of the second region labeling frame corresponding to the $k^{th}$ first region labeling frame on the first coordinate axis of the second coordinate system is the fourth end point value.

6. The image processing method according to claim 5, wherein the step of performing expansion processing on the first region labeling frames to obtain the expanded second region labeling frames further comprises:

performing expansion processing on the third side and the fourth side of the $i^{th}$ first region labeling frame in the first direction to determine the first side of the second region labeling frame corresponding to the $i^{th}$ first region labeling frame when an intersection of the coordinate interval formed by the coordinate values of the two vertexes of the third side or the fourth side of the first region labeling frame adjacent to the $i^{th}$ first region labeling frame in the first direction and located on one side close to the first side of the $i^{th}$ first region labeling frame on the first coordinate axis of the second coordinate system and the sixth coordinate interval is provided and the intersection is not empty, wherein the first side of the second region labeling frame corresponding to the $i^{th}$ first region labeling frame is adjacent to and directly contacts the second side of the first region labeling frame adjacent to the $i^{th}$ first region labeling frame in the first direction and located on one side close to the first side of the $i^{th}$ first region labeling frame;

performing expansion processing on the third side and the fourth side of the $i^{th}$ first region labeling frame in the first direction to determine the second side of the second region labeling frame corresponding to the $i^{th}$ first region labeling frame when an intersection of the coordinate interval formed by the coordinate values of the two vertexes of the third side or the fourth side of the first region labeling frame adjacent to the $i^{th}$ first region labeling frame in the first direction and located on one side close to the second side of the $i^{th}$ first region labeling frame on the first coordinate axis of the second coordinate system and the sixth coordinate interval is provided and the intersection is not empty, wherein the second side of the second region labeling frame corresponding to the $i^{th}$ first region labeling frame is adjacent to and directly contacts the first side of the first region labeling frame adjacent to the $i^{th}$ first region labeling frame in the first direction and located on one side close to the second side of the $i^{th}$ first region labeling frame;

performing expansion processing on the third side and the fourth side of the $k^{th}$ first region labeling frame in the first direction to determine the first side of the second region labeling frame corresponding to the $k^{th}$ first region labeling frame when an intersection of the coordinate interval formed by the coordinate values of the two vertexes of the third side or the fourth side of the first region labeling frame adjacent to the $k^{th}$ first region labeling frame in the first direction and located on one side close to the first side of the $k^{th}$ first region labeling frame on the first coordinate axis of the second coordinate system and the sixth coordinate interval is provided and the intersection is not empty, wherein the first side of the second region labeling frame corresponding to the $k^{th}$ first region labeling frame is adjacent to and directly contacts the second side of the first region labeling frame adjacent to the $k^{th}$ first region labeling frame in the first direction and located on one side close to the first side of the $k^{th}$ first region labeling frame; and performing expansion processing on the third side and the fourth side of the $k^{th}$ first region labeling frame in the first direction to determine the second side of the second region labeling frame corresponding to the $k^{th}$ first region labeling frame when an intersection of the coordinate interval formed by the coordinate values of the two vertexes of the third side or the fourth side of the first region labeling frame adjacent to the $k^{th}$ first region labeling frame in the first direction and located on one side close to the second side of the $k^{th}$ first region labeling frame on the first coordinate axis of the second coordinate system and the sixth coordinate interval is provided and the intersection is not empty, wherein the second side of the second region labeling frame corresponding to the $k^{th}$ first region labeling frame is adjacent to and directly contacts the first side of the first region labeling frame adjacent to the $k^{th}$ first region labeling frame in the first direction and located on one side close to the second side of the $k^{th}$ first region labeling frame.

7. The image processing method according to claim 1, wherein the step of performing expansion processing on the first region labeling frames to obtain the expanded second region labeling frames further comprises:

randomly selecting one first region labeling frame among the first region labeling frames, performing expansion processing sequentially on the first region labeling frames starting from the one first region labeling frame according to a first order;

obtaining a plurality of expansion region labeling frames after performing expansion processing on the first region labeling frames according to the first order;

treating the expansion region labeling frames as the second region labeling frames in response to each expansion region labeling frame among the expansion region labeling frames being not expanded relative to the adjacent expansion region labeling frame; and randomly selecting one expansion region labeling frame among the expansion region labeling frames in response to at least one expansion region labeling frame among the expansion region labeling frames being expanded relative to the adjacent expansion region labeling frame; performing expansion processing sequentially on the expansion region labeling frames starting from the one expansion region labeling frame according to a second order and so on until each expansion region labeling frame among the expansion region labeling frames is not expanded relative to the adjacent expansion region labeling frame, treating the expansion region labeling frames as the second region labeling frames.

8. The image processing method according to claim 7, wherein the first order and the second order are randomly determined.

9. The image processing method according to claim 1, wherein the input image further comprises a plurality of table lines extending in a first direction and a second direction and arranging in an alternating manner to divide the object regions, the table lines are located in the first coordinate system, and the first direction and the second direction are perpendicular to each other, wherein a first coordinate axis of the first coordinate system and a first coordinate axis of the second coordinate system are parallel to the first direction, and a second coordinate axis of the first coordinate system and a second coordinate axis of the second coordinate system are parallel to the second direction, wherein the image recognition method further comprises:
identifying the table lines in the input image; and
mapping the table lines from the first coordinate system to the second coordinate system according to the reference value to obtain a plurality of reference lines mapped to the table lines one-to-one, wherein the step of mapping the object region labeling frames from the first coordinate system to the second coordinate system according to the reference value to obtain the first region labeling frames corresponding to the object region labeling frames one-to-one further comprises:

obtaining first coordinates of vertexes of the object region labeling frames in the first coordinate system;

mapping the first coordinates of the vertexes of the object region labeling frames to the second coordinate system based on the reference value to obtain second coordinates of the vertexes of the object region labeling frames in the second coordinate system;

determining a plurality of middle region labeling frames corresponding to the object region labeling frames one-to-one according to the second coordinates of the vertexes of the object region labeling frames in the second coordinate system, wherein coordinates of vertexes of the middle region labeling frames in the second coordinate system are the second coordinates of the vertexes of the corresponding object region labeling frames in the second coordinate system; and obtaining the first region labeling frames based on adjustment made by the table lines on the middle region labeling frames, wherein each first region labeling frame among the first region labeling frames and the reference lines do not overlap in a region defined in the second coordinate system.

10. The image processing method according to claim 9, wherein each first region labeling frame among the first region labeling frames comprises a first side and a second side opposite to each other in the first direction and a third side and a fourth side opposite to each other in the second direction, and each second region labeling frame among the second region labeling frames comprises a first side and a second side opposite to each other in the first direction and a third side and a fourth side opposite to each other in the second direction, the step of obtaining the first region labeling frames based on adjustment made by the table lines on the middle region labeling frames further comprises:
adjusting a side of the any middle region labeling frame closest to the any reference line but does not overlap the any reference line to determine a corresponding side of the first region labeling frame corresponding to the any middle region labeling frame when the any middle region labeling frame and any reference line among the reference lines overlap regarding any middle region labeling frame among the middle region labeling frames, wherein the corresponding side of the first region labeling frame corresponding to the any middle region labeling frame overlaps the any reference line.

11. The image processing method according to claim 1, wherein the at least one object in each object region is arranged in a row in a first direction, and the step of establishing the first coordinate system based on the input image further comprises:
determining a plurality of slopes of the object region labeling frames, wherein the slope of each object region labeling frame among the object region labeling frames represents the slope of a side of each object region labeling frame extending in the first direction with respect to the first direction;
performing correction processing on the input image according to the slopes of the object region labeling frames to obtain a corrected input image; and
establishing the first coordinate system based on the corrected input image, wherein a first coordinate axis of the first coordinate system is parallel to the first direction, and a second coordinate axis of the first coordinate system is parallel to the second direction perpendicular to the first direction.

12. The image processing method according to claim 11, wherein the step of performing correction processing on the input image according to the slopes of the object region labeling frames further comprises:
calculating an average of the slopes according to the slopes of the object region labeling frames; and
rotating the input image in a plane formed by the first direction and the second direction based on the average of the slopes, such that the average of the slopes approaches 0.

13. The image processing method according to claim 1, wherein the step of mapping the object region labeling frames from the first coordinate system to the second coordinate system according to the reference value to obtain the first region labeling frames corresponding to the object region labeling frames one-to-one further comprises:

obtaining first coordinates of vertexes of the object region labeling frames in the first coordinate system;
mapping the first coordinates of the vertexes of the object region labeling frames to the second coordinate system based on the reference value to obtain second coordinates of the vertexes of the object region labeling frames in the second coordinate system; and
determining the first region labeling frames corresponding to the object region labeling frames one-to-one according to the second coordinates of the vertexes of the object region labeling frames in the second coordinate system, wherein coordinates of vertexes of the first region labeling frames in the second coordinate system are the second coordinates of the vertexes of the corresponding object region labeling frames in the second coordinate system.

14. The image processing method according to claim 13, wherein the step of mapping the first coordinates of the vertexes of the object region labeling frames to the second coordinate system based on the reference value to obtain the second coordinates of the vertexes of the object region labeling frames in the second coordinate system further comprises:
dividing the first coordinates of the vertexes of the object region labeling frames by the reference value to obtain middle coordinates of the vertexes of the object region labeling frames; and
performing rounding off processing on the middle coordinates to obtain the second coordinates of the vertexes of the object region labeling frames in the second coordinate system.

15. The image processing method according to claim 14, wherein the at least one object comprises text, and the reference value is determined according to an average character height of the text.

16. The image processing method according to claim 15, wherein the reference value is equal to one third of the average character height of the text.

17. The image processing method according to claim 1, wherein the step of mapping the second region labeling frames from the second coordinate system to the first coordinate system according to the reference value to obtain the table region labeling frames corresponding to the object regions one-to-one further comprises:
obtaining second coordinates of vertexes of the second region labeling frames in the second coordinate system;
mapping the second coordinates of the vertexes of the second region labeling frames from the second coordinate system to the first coordinate system based on the reference value to obtain first coordinates of the vertexes of the second region labeling frames in the first coordinate system; and
determining the table region labeling frames corresponding to the second region labeling frames one-to-one according to the first coordinates of the vertexes of the second region labeling frames in the first coordinate system, wherein coordinates of vertexes of the table region labeling frames in the first coordinate system are the first coordinates of the vertexes of the corresponding second region labeling frames in the first coordinate system.

18. The image processing method according to claim 1, wherein the at least one object comprises text, and the image processing method further comprises:
adjusting a character height and/or font of the text filled in the table region labeling frames.

19. An electronic apparatus, comprising a processor and a storage,
  wherein the storage is configured to store a computer-readable instruction,
  wherein the processor is configured to execute the computer-readable instruction and implement the steps of the method according to claim 1.

20. An image processing device, comprising:
  a storage; and
  a processor, coupled to the storage and configured to:
  obtain an input image, wherein the input image comprises a plurality of object regions, and each object region among the object regions comprises at least one object;
  identify the object regions in the input image to obtain a plurality of object region labeling frames corresponding to the object regions one-to-one;
  establish a first coordinate system based on the input image, wherein the object region labeling frames are located in the first coordinate system;
  map the object region labeling frames from the first coordinate system to a second coordinate system according to a reference value to obtain a plurality of first region labeling frames corresponding to the object region labeling frames one-to-one, wherein the first region labeling frames are located in the second coordinate system; and
  perform expansion processing on the first region labeling frames to obtain a plurality of expanded second region labeling frames, wherein the first region labeling frames correspond to the second region labeling frames one-to-one;
  wherein the processor is further configured to map the second region labeling frames from the second coordinate system to the first coordinate system according to the reference value to obtain a plurality of table region labeling frames corresponding to the object regions one-to-one, and identify the at least one object included in each object region among the object regions and fill the at least one object included in each object region among the object regions into the corresponding table region labeling frame to generate a table.

* * * * *